US012675427B2

(12) United States Patent
Yu et al.

(10) Patent No.: US 12,675,427 B2
(45) Date of Patent: Jul. 7, 2026

(54) PCIE CHANNEL SWITCHES IN DATA TRANSMISSION SYSTEMS WHEREIN SELECTED PCIE CHANNEL FURTHER ENABLES THE HOST DEVICE TO COMMUNICATE

(71) Applicant: SUZHOU BAYHUB ELECTRONICS TECHNOLOGY CO., LTD., Jiangsu (CN)

(72) Inventors: Xiaoguang Yu, Jiangsu (CN); Hongzhang Wang, Jiangsu (CN); Min Wang, Jiangsu (CN); Yishao-Max Huang, Jiangsu (CN); Jeng-Luen Li, Jiangsu (CN)

(73) Assignee: SUZHOU BAYHUB ELECTRONICS TECHNOLOGY CO., LTD., Suzhou (CN)

( * ) Notice: Subject to any disclaimer, the term of this patent is extended or adjusted under 35 U.S.C. 154(b) by 93 days.

(21) Appl. No.: 18/761,111

(22) Filed: Jul. 1, 2024

(65) Prior Publication Data

US 2024/0354274 A1 Oct. 24, 2024

Related U.S. Application Data

(63) Continuation-in-part of application No. 18/605,394, filed on Mar. 14, 2024, now Pat. No. 12,321,303, (Continued)

(30) Foreign Application Priority Data

Mar. 5, 2021 (CN) .......................... 202110246450.9
Jul. 7, 2023 (CN) .......................... 202310833488.5

(51) Int. Cl.
*G06F 13/00* (2006.01)
*G06F 13/42* (2006.01)

(52) U.S. Cl.
CPC ...... *G06F 13/4221* (2013.01); *G06F 13/4234* (2013.01); *G06F 2213/0026* (2013.01)

(58) Field of Classification Search
CPC ... G06F 13/4221; G06F 13/4234; G06F 13/00
See application file for complete search history.

(56) References Cited

U.S. PATENT DOCUMENTS 11,573,917 B2 * 2/2023 Long ....................... G06F 1/189
11,630,480 B2 4/2023 Harriman et al.
(Continued)

FOREIGN PATENT DOCUMENTS

CN 109634899 A 4/2019
CN 114328327 A 4/2022
(Continued)

*Primary Examiner* — Tammara R Peyton

(57) ABSTRACT

A PCIe channel switch includes multiple PCIe channels and a control circuit. The PCIe channels can connect to a host device. Each PCIe channel of the PCIe channels can connect the host device with an electronic device via a respective PCIe device. The control circuit can control the on/off state of each PCIe channel of the PCIe channels. The control circuit can select a PCIe channel of the PCIe channels to be turned on, and turns off the other channels of the PCIe channels when the selected PCIe channel is on, thereby enabling the host device to communicate with a selected electronic device through the selected PCIe channel.

16 Claims, 18 Drawing Sheets

Related U.S. Application Data which is a continuation of application No. 17/684,
759, filed on Mar. 2, 2022, now Pat. No. 11,971,838.

(56) References Cited

U.S. PATENT DOCUMENTS

| | | | |
|---|---|---|---|
| 11,681,644 B2 * | 6/2023 | Long .................. | G06F 13/4027 |
| | | | 710/302 |
| 11,971,838 B2 | 4/2024 | Huang et al. | |
| 12,339,946 B2 * | 6/2025 | Kotake ................ | G06F 3/0655 |

FOREIGN PATENT DOCUMENTS

| | | |
|---|---|---|
| CN | 217787754 U | 11/2022 |
| TW | 202236107 A | 9/2022 |

* cited by examiner

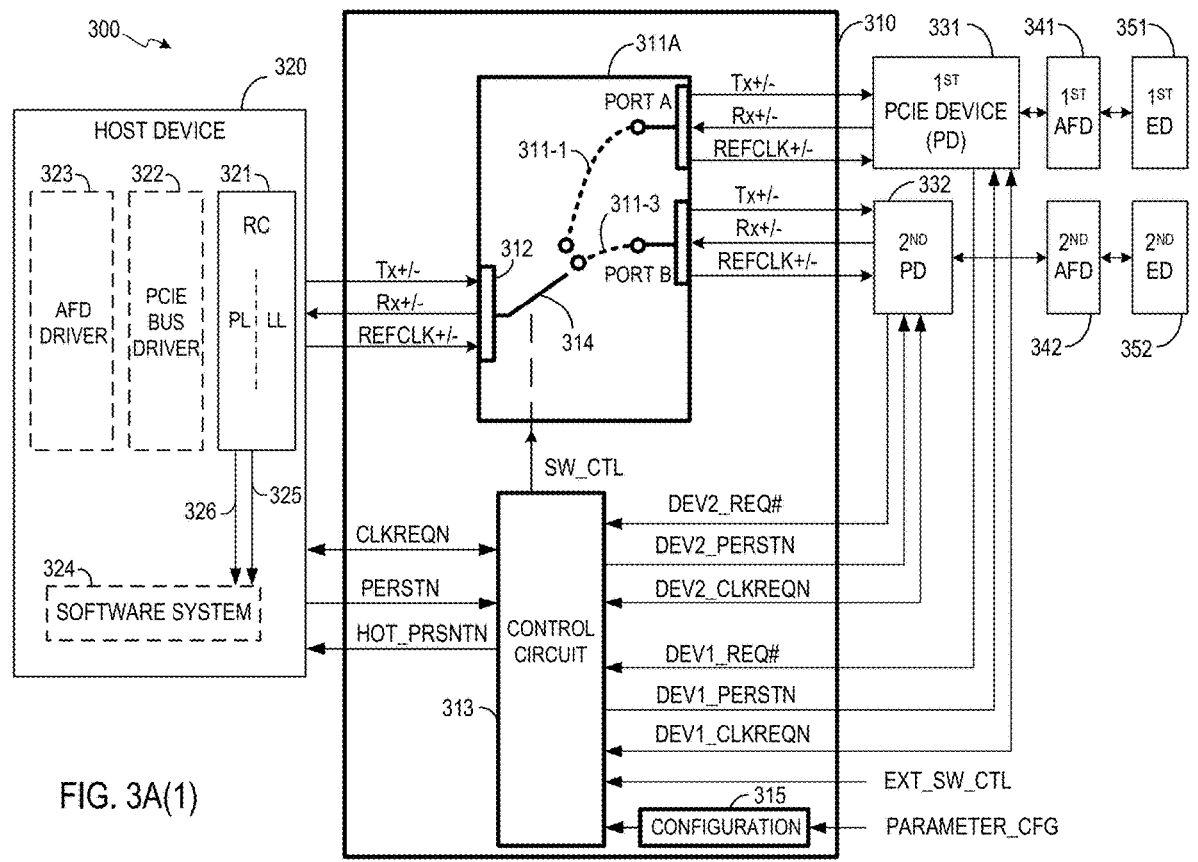
FIG. 3A(1)

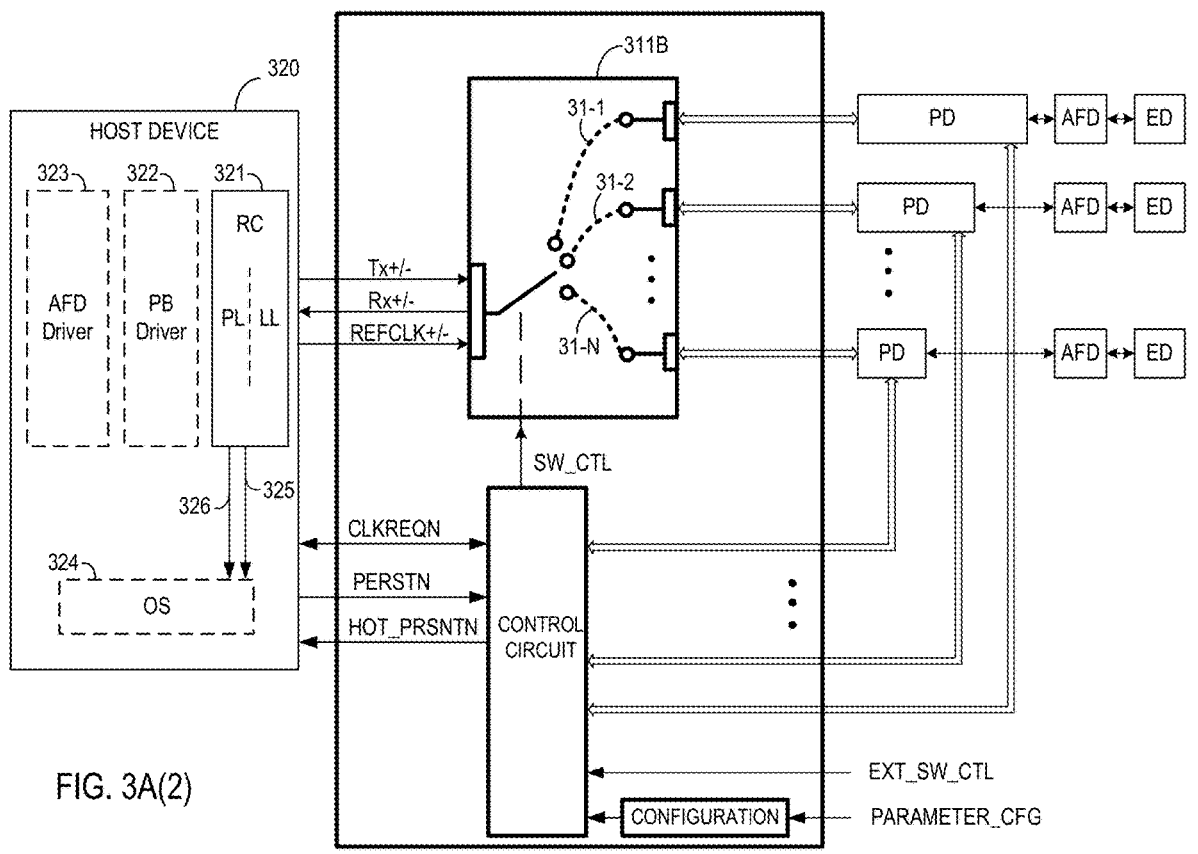
FIG. 3A(2)

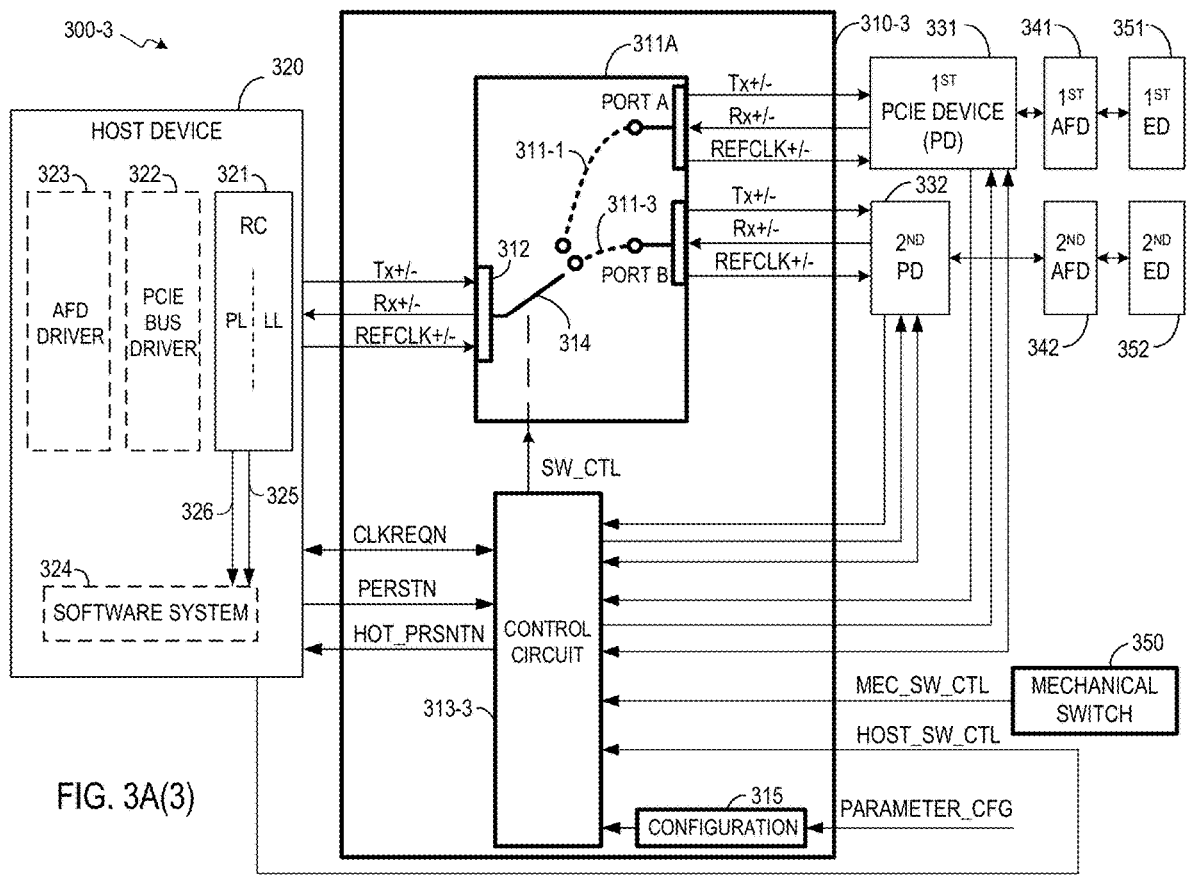
FIG. 3A(3)

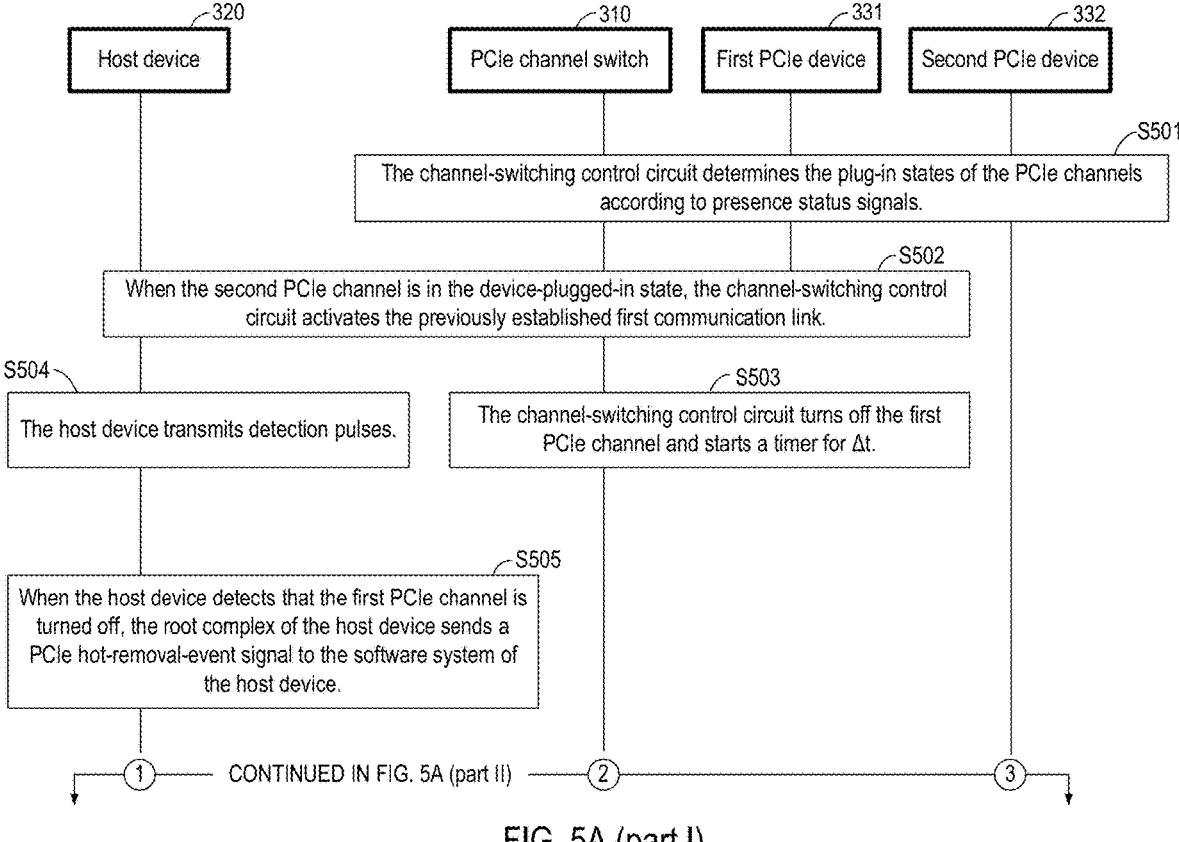
FIG. 5A (part I)

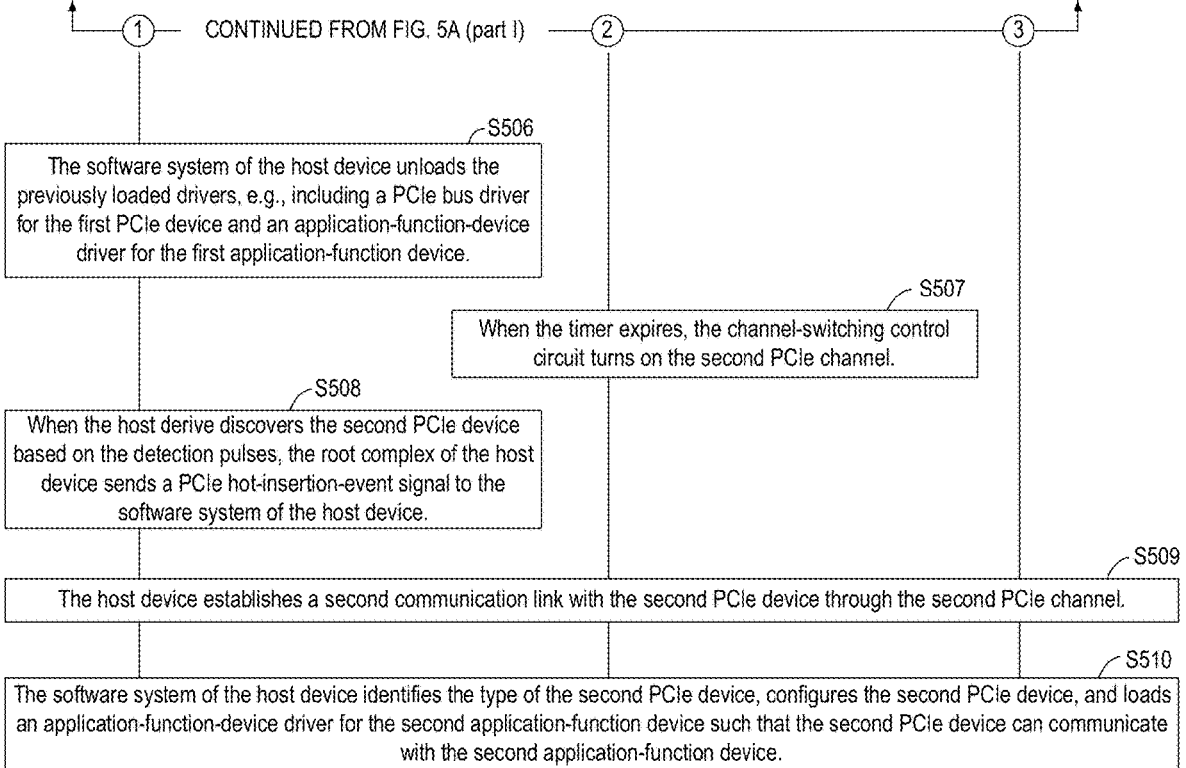
FIG. 5A (part II)

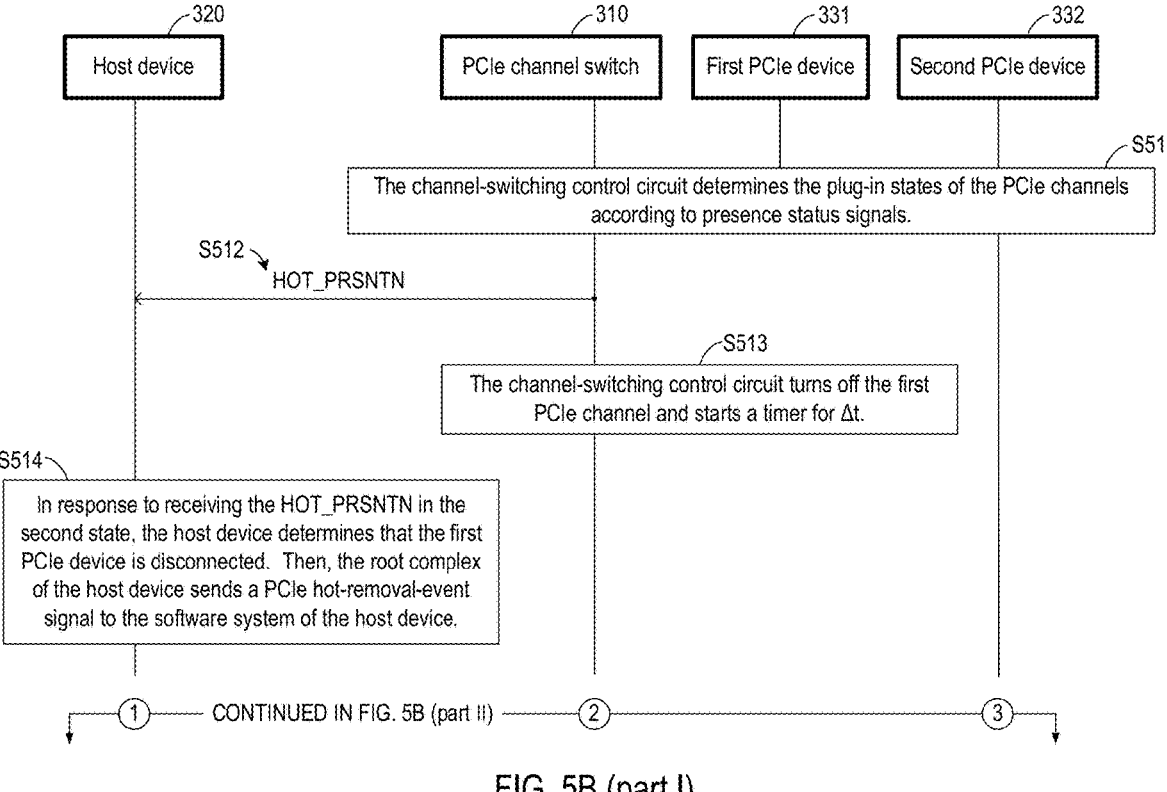
FIG. 5B (part I)

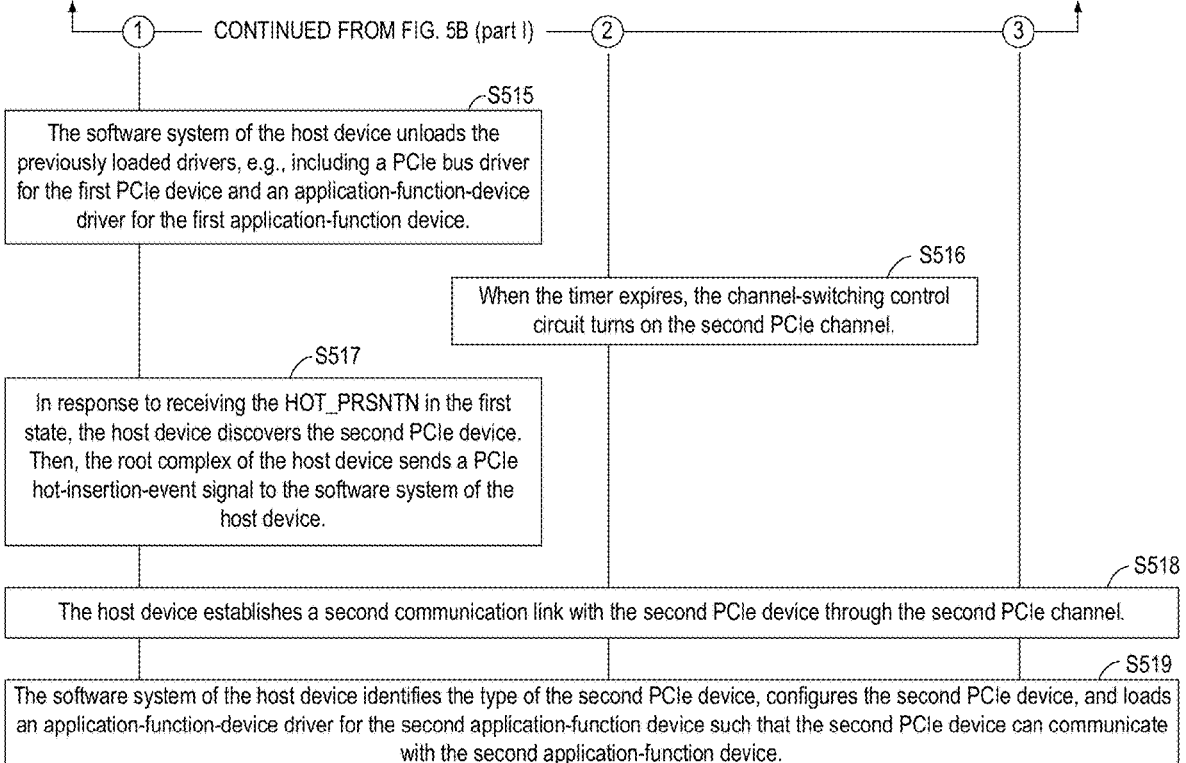
FIG. 5B (part II)

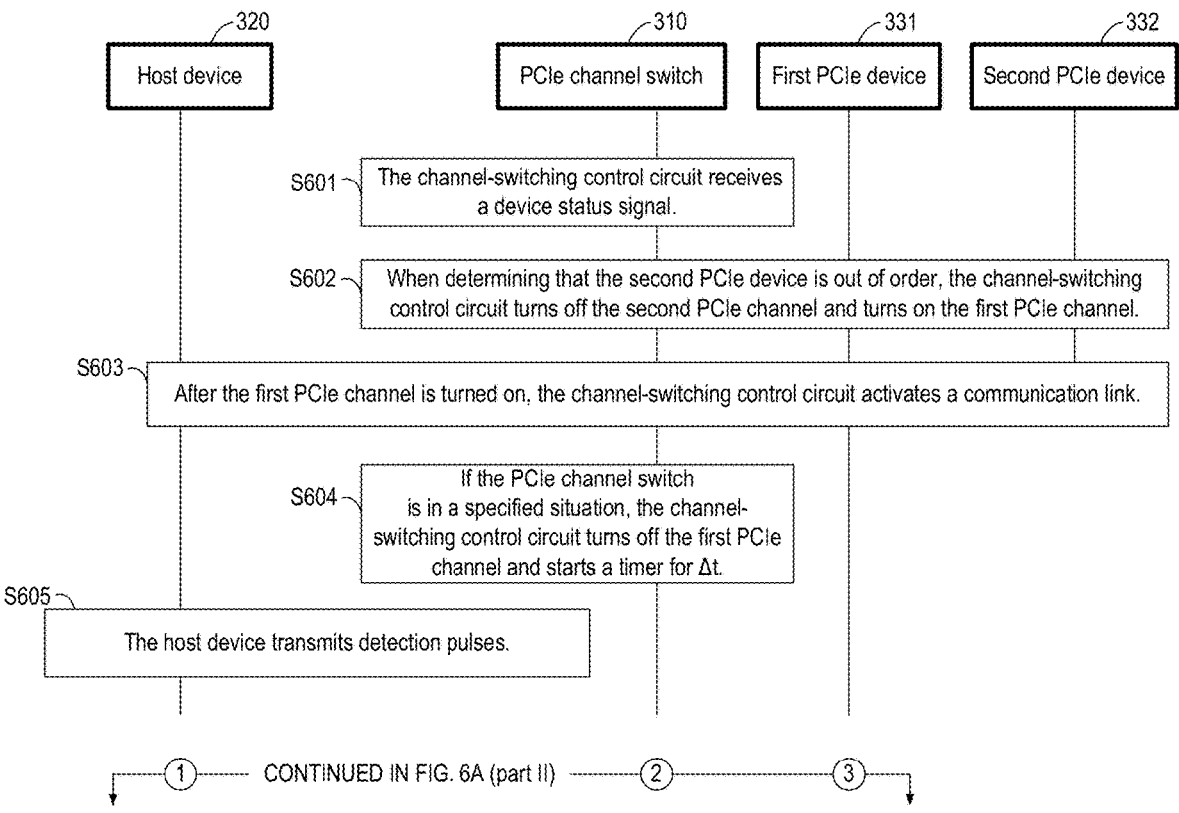
FIG. 6A (part I)

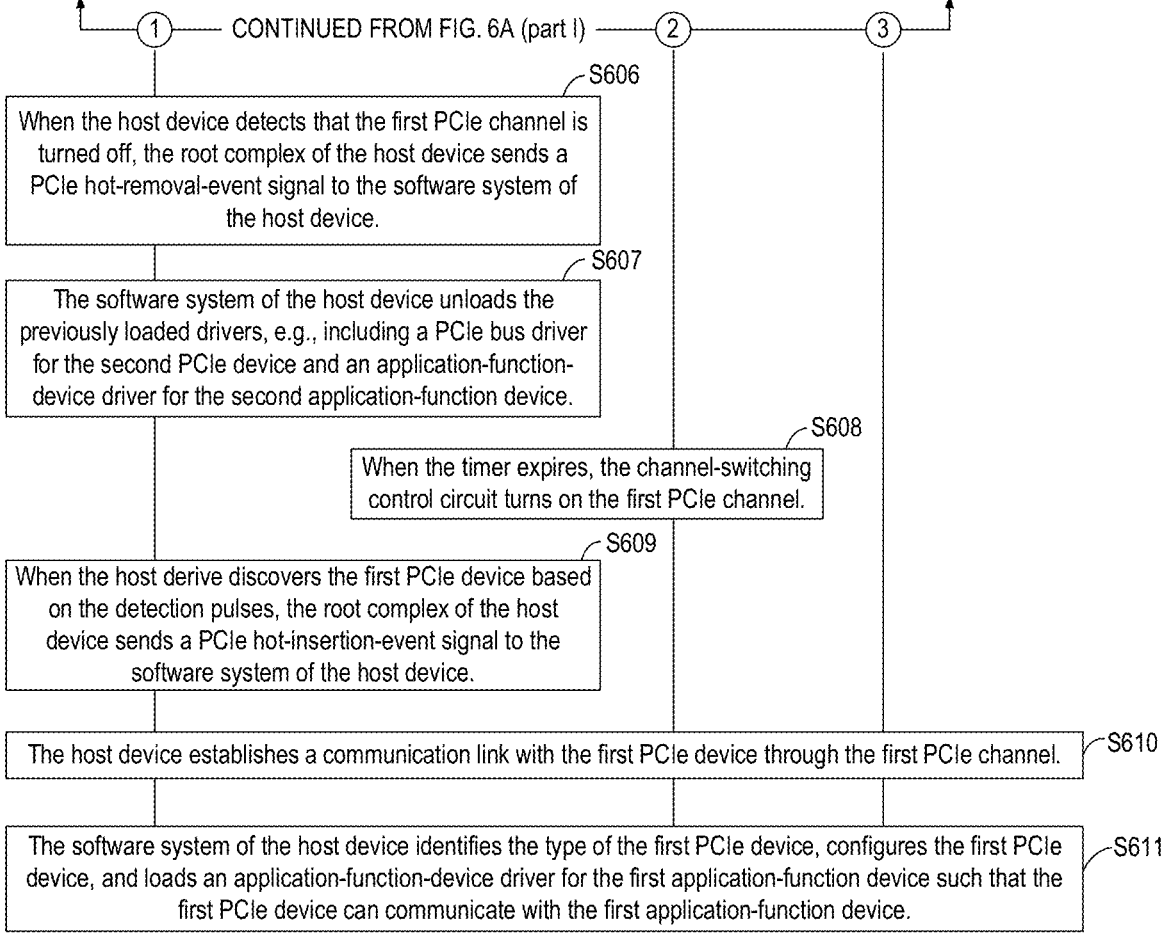

CONTINUED FROM FIG. 6A (part I)

S606

When the host device detects that the first PCIe channel is turned off, the root complex of the host device sends a PCIe hot-removal-event signal to the software system of the host device.

S607

The software system of the host device unloads the previously loaded drivers, e.g., including a PCIe bus driver for the second PCIe device and an application-function-device driver for the second application-function device.

S608

When the timer expires, the channel-switching control circuit turns on the first PCIe channel.

S609

When the host derive discovers the first PCIe device based on the detection pulses, the root complex of the host device sends a PCIe hot-insertion-event signal to the software system of the host device.

S610

The host device establishes a communication link with the first PCIe device through the first PCIe channel.

S611

The software system of the host device identifies the type of the first PCIe device, configures the first PCIe device, and loads an application-function-device driver for the first application-function device such that the first PCIe device can communicate with the first application-function device.

FIG. 6A (part II)

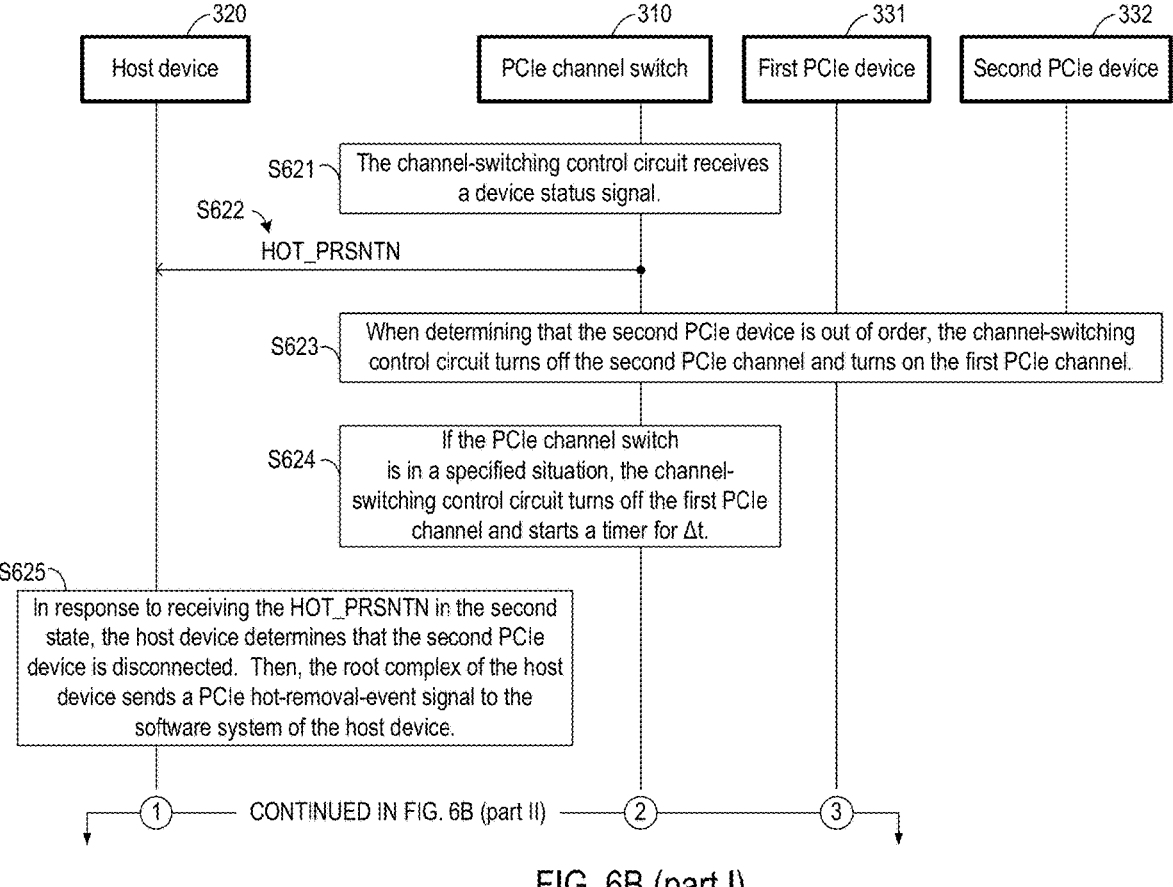
FIG. 6B (part I)

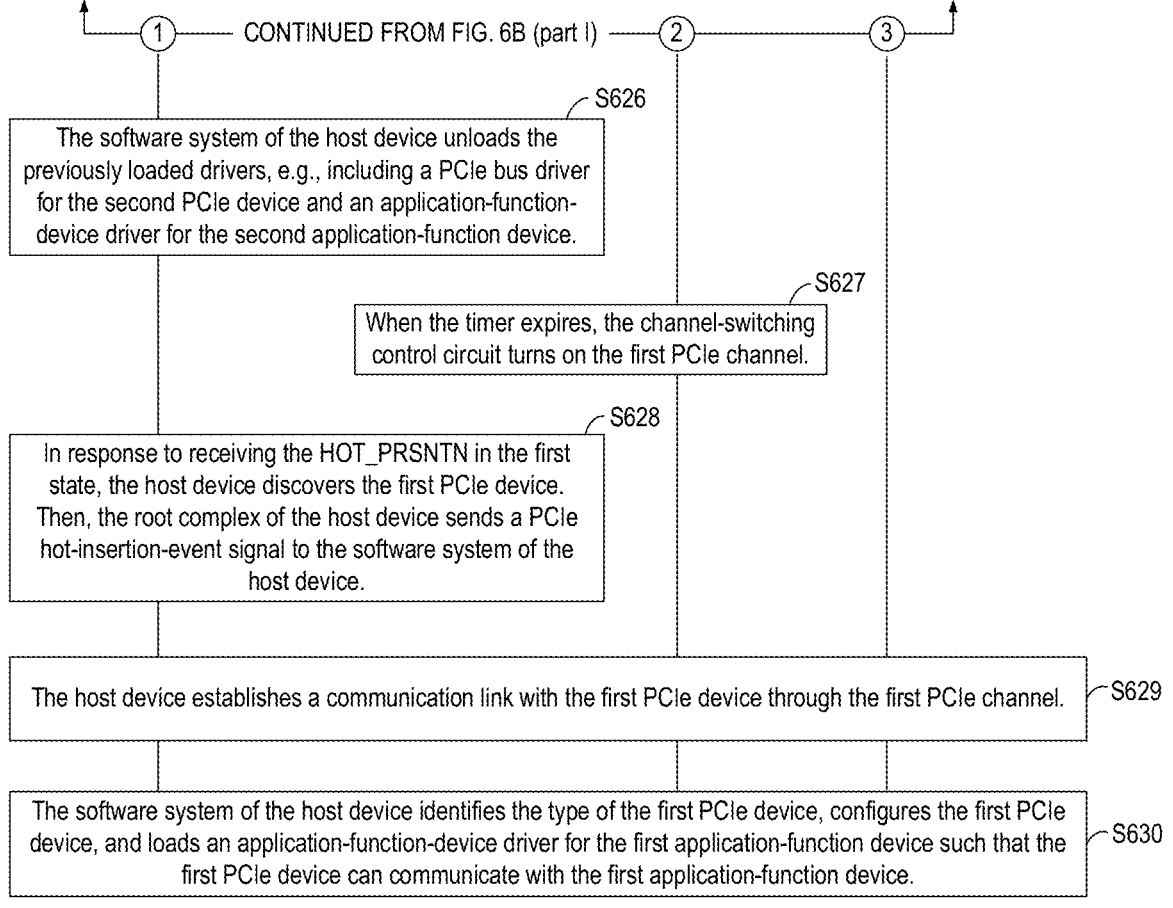
FIG. 6B (part II)

700

701

CONTROLLING THE ON/OFF STATES OF A SET OF PCIE CHANNELS

703

SELECTING A PCIE CHANNEL OF THE PCIE CHANNELS TO BE TURNED ON

705

TURNING OFF THE OTHER CHANNELS OF THE PCIE CHANNELS WHEN THE SELECTED PCIE CHANNEL IS TURNED ON

707

ENABLING COMMUNICATION BETWEEN A HOST DEVICE AND A SELECTED ELECTRONIC DEVICE THROUGH THE SELECTED PCIE CHANNEL

PCIE CHANNEL SWITCHES IN DATA TRANSMISSION SYSTEMS WHEREIN SELECTED PCIE CHANNEL FURTHER ENABLES THE HOST DEVICE TO COMMUNICATE

REFERENCE TO RELATED APPLICATIONS

The present application claims benefit under 35 U.S.C. § 119(a) to application Ser. No. 202310833488.5, filed with the State Intellectual Property Office of the People's Republic of China on Jul. 7, 2023, and the present application is also a continuation-in-part of the co-pending U.S. patent application Ser. No. 18/605,394, filed on Mar. 14, 2024, which itself is a continuation application of the co-pending commonly-owned U.S. patent application Ser. No. 17/684,759, U.S. Pat. No. 11,971,838, filed on Mar. 2, 2022, which itself claims benefit under 35 U.S.C. § 119(a) to application No. 202110246450.9, filed with the State Intellectual Property Office of the People's Republic of China on Mar. 5, 2021, and all of which are hereby incorporated by reference in their entirety.

BACKGROUND

Peripheral component interconnect express (PCIe) is a high-speed serial computer expansion bus standard. A PCIe bus uses a high-speed differential bus and adopts an end-to-end connection mode to enable communication between devices. Using a PCIe interface, a processor can be connected to external devices. For example, a processor and a secure digital (SD) card can be connected via a PCIe interface, so that a PCIe connection and communication can be established between the processor and the SD card. In addition, PCIe supports a hot-plug function, which allows a system to switch its connection from an external device to another external device without powering off the system.

A PCIe connection occupies a few PCIe lanes. More PCIe connections occupy more PCIe lanes. However, the processor supports a limited number of PCIe lanes. For example, a central processing unit (CPU) of some platforms supports up to 40 PCIe lanes. The CPU may not be able to support PCIe connections with multiple external devices if the number of external devices is too large. Using a PCIe switch can solve this problem. Specifically, a PCIe interface of a CPU can connect to a PCIe switch, and the PCIe switch can connect to multiple electronic devices; that is, the PCIe switch can connect multiple electronic devices with a PCIe interface of a CPU.

FIG. 1 illustrates a block diagram of an example of a conventional PCIe switch 100. The PCIe switch 100 includes an upstream port 101 and multiple downstream ports 103. The upstream port 101 is connected to each downstream port 103 through a virtual PCI-PCI bridge. The specific functions, structure, and design principles of the PCIe switch 100 shown in FIG. 1 can be found in relevant PCIe switch protocol documentation and are not described here.

Multiple PCIe devices can establish PCIe communication links with a root complex of a CPU through the PCIe switch 100. These PCIe communication links will remain in a "connected" status (e.g., the PCIe devices remain being connected to the root complex of the CPU through the PCIe communication links) during the process of parsing and forwarding PCIe data packets in the PCIe switch. Moreover, during a switching process of PCIe devices (e.g., a device communicating with the CPU switches from a PCIe device to another PCIe device), the PCIe communication links will also remain in the "connected" status. As a result, the PCIe switch 100 needs to parse PCIe data packets received by the port 101 and forward the data packets to the corresponding port 103 based on address information in the data packets. To parse the PCIe data packets and forward them according to the address information, each port 103 needs to be provided with circuitry to implement a PCIe physical layer (PHY) and a PCIe link layer. This leads to a complicated design and a high manufacturing cost of a PCIe switch.

SUMMARY

In an embodiment, a PCIe channel switch includes multiple PCIe channels and a control circuit. The PCIe channels can connect to a host device. Each PCIe channel of the PCIe channels can connect the host device with an electronic device via a respective PCIe device. The control circuit can control each PCIe channel of the PCIe channels, to turn each PCIe channel on or off. The control circuit can select a PCIe channel of the PCIe channels to be turned on, and can turn off the other channels of the PCIe channels when the selected PCIe channel is on, thereby enabling the host device to communicate with a selected electronic device through the selected PCIe channel.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

FIG. 3A (1) illustrates a block diagram of an example of a data transmission system, in an embodiment of the present invention.

FIG. 3A (2) illustrates a block diagram of an example of a data transmission system, in an embodiment of the present invention.

FIG. 3A (3) illustrates a block diagram of an example of a data transmission system, in an embodiment of the present invention.

FIG. 5A, including FIG. 5A (part I) and FIG. 5A (part II), illustrates an example of a flowchart for a PCIe channel switch interacting with a host device and multiple PCIe devices, in an embodiment of the present invention.

FIG. 5B, including FIG. 5B (part I) and FIG. 5B (part II), illustrates an example of a flowchart for a PCIe channel switch interacting with a host device and multiple PCIe devices, in an embodiment of the present invention.

FIG. 6A, including FIG. 6A (part I) and FIG. 6A (part II), illustrates an example of a flowchart for a PCIe channel switch interacting with a host device and multiple PCIe devices, in an embodiment of the present invention.

FIG. 6B, including FIG. 6B (part I) and FIG. 6B (part II), illustrates an example of a flowchart for a PCIe channel switch interacting with a host device and multiple PCIe devices, in an embodiment of the present invention.

DETAILED DESCRIPTION

Figure 1:
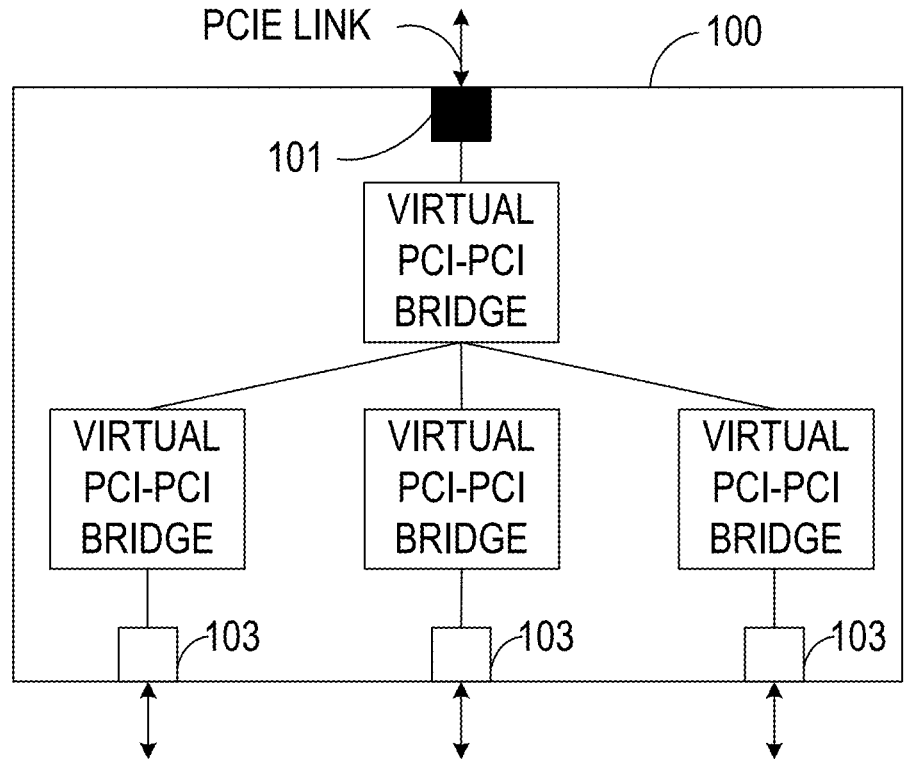
FIG. 1 illustrates a block diagram of a conventional PCIe switch.

Reference will now be made in detail to the embodiments of the present invention. While the invention will be described in conjunction with these embodiments, it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

As used herein, the term "include" represents "include but not limited to." Unless otherwise indicated, the term "or" represents "and/or." The term "based on" represents "at least partially based on." The term "an embodiment" represents "at least one embodiment." The term "another embodiment" represents "at least one other embodiment."

As used herein, the terms "first," "second," and the like are used to distinguish different objects. The use of the terms "first," "second," and the like does not limit the order or function of their corresponding objects. For example, the "first PCIe channel" and "second PCIe channel" used herein are used to indicate that they are different channels, without implying any sequence or limitations on their functions.

In embodiments of the present invention, the term "coupled" can be interpreted as "electrical coupled" or "electrically connected" or "communicatively connected." For example, A is coupled to B can indicate that A and B are electrically connected or that A can communicate with B and/or B can communicate with A.

In embodiments of the present invention, N is a configurable integer, and N is greater than one (e.g., N=2, 3, . . . ). Devices respectively corresponding to N PCIe channels can include N PCIe devices, N application-function devices, and N electronic devices. Each of the N PCIe channels can be used to establish a communication link. Also, each of the N PCIe channels can transmit or receive signals such as but not limited to a presence status signal, a reset signal, a clock-recovery-request signal, and a hot-plug-event signal. Related definitions of these terms are presented as follows.

A first PCIe channel refers to one of the N PCIe channels. A second PCIe channel refers to one of the N PCIe channels other than the first PCIe channel.

A first PCIe device refers to one of the N PCIe devices. A second PCIe device refers to one of the N PCIe devices other than the first PCIe device.

A first application-function device refers to one of the N application-function devices. A second application-function device refers to one of the N application-function devices other than the first application-function device.

A first electronic device refers to one of the N electronic devices. A second electronic device refers to one of the N electronic devices other than the first electronic device.

Embodiments according to the present invention provide PCIe channel switches and data transmission systems. In an embodiment, the PCIe channel switch includes multiple PCIe channels and a control circuit. The multiple PCIe channels can connect to a host device and multiple electronic devices. Each PCIe channel can be used to connect the host device with an electronic device via a PCIe device. The control circuit can control each PCIe channel, to turn each PCIe channel on or off, for example. In an embodiment, the control circuit selects a PCIe channel to be turned on, and turns off the other PCIe channels, so that the host device can communicate with an electronic device through the selected PCIe channel. As a result, the circuitry of the PCIe channel switch can be simplified and the manufacturing costs can be reduced, compared with that of a conventional PCIe switch such as the conventional PCIe switch 100 of FIG. 1.

Figure 2:
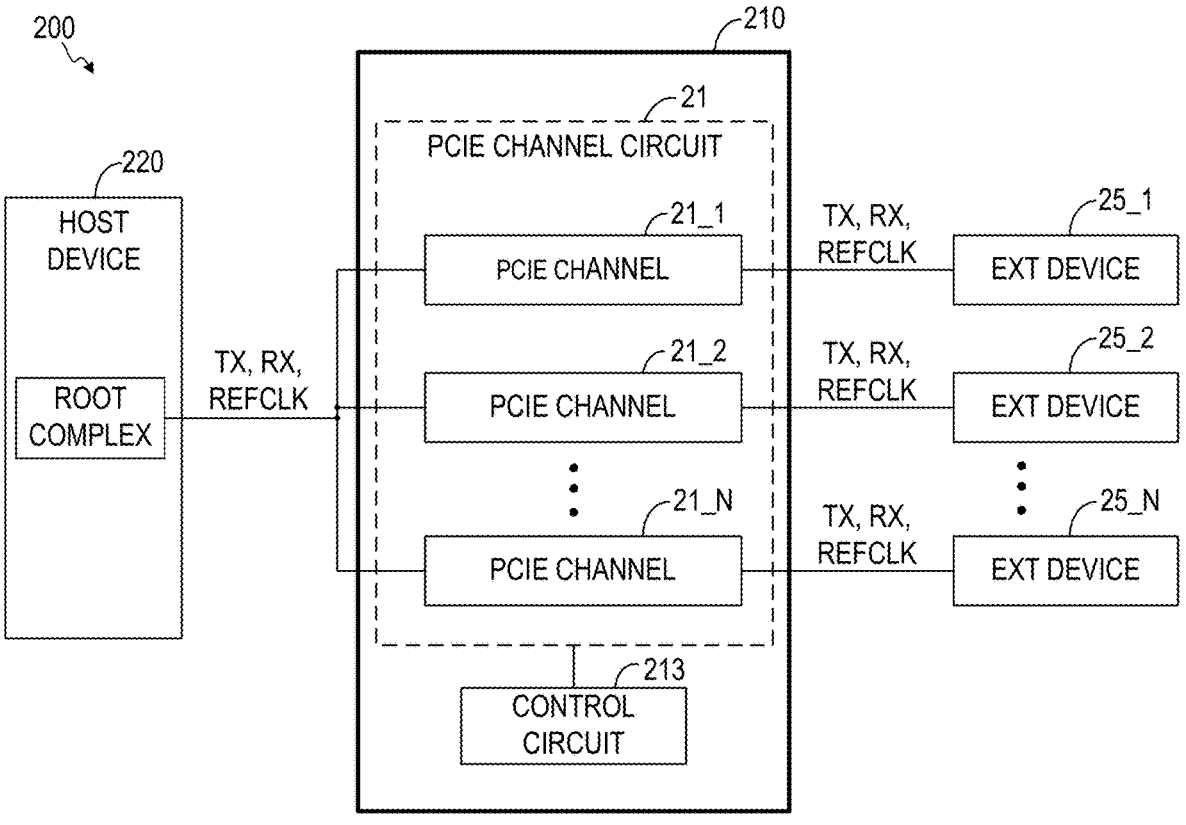
FIG. 2 illustrates a block diagram of an example of a data transmission system, in an embodiment of the present invention.

FIG. 2 illustrates a block diagram of an example of a data transmission system 200, in an embodiment of the present invention. As shown in FIG. 2, the data transmission system 200 includes a host device 220 and a PCIe channel switch 210. The PCIe channel switch 210 can be used for PCIe channel switching.

The PCIe channel switch 210 includes a PCIe channel circuit 21 and a control circuit 213. The PCIe channel circuit 21 includes PCIe channels 21_1-21_N. Each PCIe channel in the PCIe channel circuit 21 can connect the host device 220 with an electronic device (e.g., 25_1, 25_2, . . . , or 25_N) corresponding to the PCIe channel. For example, a first PCIe channel 21_1 can connect the host device 220 with a first electronic device 25_1, a second PCIe channel 21_2 can connect the host device 220 with a second electronic device 25_2, and so on. In an embodiment, an electronic device corresponding to a PCIe channel can be an electronic device inserted into the PCIe channel. The control circuit 213 can control the on/off state of each PCIe channel; that is, the control circuit 213 can turn each PCIe channel on or off. Each PCIe channel can be turned on or off independently of each of the other PCIe channels; that is, the on or off state of each PCIe channel is independent of the on or off state of any other PCIe channel.

The host device 220 can establish a communication link (including a PCIe communication link) with an electronic device (e.g., 25_1, 25_2, . . . , or 25_N) through a PCIe channel (e.g., 21_1, 21_2, . . . , or 21_N) that corresponds to the electronic device, and therefore can communicate with the electronic device through the communication link. In an embodiment, the host device 220 includes a processor (e.g., a central processing unit, CPU), memory, and a PCIe root complex. The PCIe root complex can be used to establish the communication link between the processor and memory and the PCIe channel switch 210, to communicate with the electronic device. Signals in this communication process can include, but are not limited to, a TX signal, a RX signal, and a REFCLK signal.

In an embodiment, when a selected PCIe channel of the PCIe channels 21_1-21_N is turned on, the control circuit 213 can control the other channels of the PCIe channels 21_1-21_N (other than the selected PCIe channel) to be turned off, so that the host device 220 can communicate with an electronic device corresponding to the selected PCIe channel through the selected PCIe channel. Thus, when the host device 220 communicates with the electronic device through the PCIe channel switch 210, only one PCIe channel of the PCIe channels 21_1-21_N is turned on, so that PCIe data packets can be transmitted through the turned-on PCIe channel in the PCIe channel switch 210 without the need of using address information like the conventional PCIe switch 100 does.

In an embodiment, the host device 220 includes, but is not limited to, a laptop, a desktop computer, a server, and the like. An electronic device (e.g., 25_1, 25_2, . . . , or 25_N) corresponding to a PCIe channel includes a device that supports the PCIe protocol. For example, the electronic device includes, but is not limited to, an SD card, a solid state disk (SSD), a hard disk drive (HDD), a graphics processing unit (GPU), a network interface card, and the like. In an embodiment, a connection between a PCIe channel and the root complex of the host device 220 includes a PCIe bus connection. A connection between the PCIe channel and the corresponding electronic device can also include a PCIe bus connection. In an embodiment, the TX signal includes a TX+ signal and a TX-signal (which can be referred to as TX+/− signals); the RX signal includes an RX+ signal and an RX-signal (which can be referred to as RX+/− signals); and the REFCLK signal includes a REFCLK+ signal and a REFCLK-signal (which can be referred to as REFCLK+/− signals). The TX and RX signals refer to high-speed serial differential signals. The TX signal can represent signals transmitted by a sending end. The RX signal can represent signals received by a receiving end. The REFCLK signal represents a reference clock signal.

In an embodiment, the control circuit 213 is designed using digital logic circuitry to perform various functions. In an embodiment, the PCIe channel switch 210 can perform some or all of the functions that a PCIe switch can perform.

FIG. 3A (1) illustrates a block diagram of an example of a data transmission system 300, in an embodiment of the present invention. FIG. 3A (1) is described in combination with FIG. 2. In the example of FIG. 3A (1), the data transmission system 300 includes a host device 320 and a PCIe channel switch 310. The host device 320 can be an embodiment of the host device 220. The PCIe channel switch 310 can be an embodiment of the PCIe channel switch 210. The PCIe channel switch 310 can connect to a set of electronic devices (EDs) through a set of PCIe devices (PDs) and a set of application-function devices (AFDs). In an embodiment, a PCIe device includes a devce capable of establishing a communication channel for an ADF such that the ADF can communicate with another device through the communication channel using the PCIe communication protocol. In an embodiment, an ADF includes a device capable of executing specific application-level functions and capabilities. For example, the ADF can be an SD host controller. For example, the ADF can be an NVMe (nonvolatile memory express) host controller.

In an embodiment, a software system 324 such as an operating system is installed) in persistent memory (e.g., in memory such as a hard drive, not shown) in the host device 320. The software system 324, e.g., the operating system, includes an application layer. An AFD driver 323 and a PCIe bus driver 322 can also be a part of or in communcation with the software system 324. The host device 320 also includes a root complex (RC) 321. The root complex includes a PCIe physical layer (PL) and a PCIe link layer (LL).

The PCIe channel switch 310 includes a PCIe channel circuit 311A, a channel-switching control circuit 313, and a parameter-configuration circuit 315. The PCIe channel circuit 311A can be an embodiment of the PCIe channel circuit 21. The combined circuit of the channel-switching control circuit 313 and the parameter-configuration circuit 315 can be an embodiment of the control circuit 213.

In an embodiment, the PCIe channel circuit 311A includes a switch 314, a connection terminal 312, a physical port A, a physical port B, a logical port C, and a logical port D. The logical ports C and D are virtual ports, and they are not shown in FIG. 3A (1). The connection terminal 312 is coupled to the root complex 321 of the host device 320. The physical port A can be coupled to a first electronic device (1$^{st}$ ED) 351 via a first PCIe device (1$^{st}$ PD) 331 and a first application-function device (1$^{st}$ AFD) 341. The physical port B can be coupled to a second electronic device (2$^{nd}$ ED) 352 via a second PCIe device 332 (2$^{nd}$ PD) and a second application-function device (2$^{nd}$ AFD) 342. In a first connection state of the switch 314, the switch 314 connects the terminal 312 to the physical port A and disconnects the terminal 312 from the physical port B. In a second connection state of the switch 314, the switch 314 connects the terminal 312 to the physical port B and disconnects the terminal 312 from the physical port A. In a third connection state of the switch 314, the switch 314 disconnects the terminal 312 from the physical ports A and B. In a fourth connection state of the switch 314, the switch 314 connects the terminal 312 to both the physical ports A and B. The combined circuit of the connection terminal 312, the switch 314, and the physical port A is referred to as a first PCIe channel 311-1, which can be an embodiment of the first PCIe channel 21_1. The combined circuit of the connection terminal 312, the switch 314, and the physical port B is referred to as a second PCIe channel 311-3, which can be an embodiment of the second PCIe channel 21_2.

In an embodiment, the channel-switching control circuit 313 can generate a channel control signal SW_CTL to control the on/off state of the PCIe channels 311-1 and 311-3 (that is, these channels are turned off and on using the channel control signal SW_CTL under control of the channel-switching control circuit 313). The channel-switching control circuit 313 can also control turning the the PCIe channels 311-1 and 311-3 off and on by setting the connection state of the switch 314. For example, the channel-switching control circuit 313 can set the switch 314 to the first connection state to turn on the first PCIe channel 311-1 and turn off the second PCIe channel 311-3. The channel-switching control circuit 313 can also set the switch 314 to the second connection state to turn on the second PCIe channel 311-3 and turn off the first PCIe channel 311-1. The channel-switching control circuit 313 can also set the switch 314 to the third connection state to turn off the first PCIe channel 311-1 and the second PCIe channel 311-3. In an embodiment, the channel-switching control circuit 313 can also set the switch 314 to the fourth connection state to turn on the first PCIe channel 311-1 and the second PCIe channel 311-3. In an embodiment, the switch 314 includes a high-speed differential signal switching switch.

In another embodiment, the first PCIe channel 311-1 includes a first switch, and the second PCIe channel 311-3 includes a second switch. The on/off state of the first PCIe channel 311-1 can be controlled by turning the first switch on and off. The on/off state of the second PCIe channel 311-3 can be controlled by turning the second switch on and off. The first switch and the second switch include, but are not limited to, transistors such as metal-oxide-semiconductor field-effect transistors (MOSFETs).

In an embodiment, signals transmitted between the channel-switching control circuit 313 (or the control circuit 213)

and the host device 320 include a clock-recovery-request signal CLKREQN and a reset signal PERSTN. Signals transmitted between the channel-switching control circuit 313 and the first PCIe device 331 can also include a first presence status signal DEV1_REQ #, a first reset signal DEV1_PERSTN, and a first clock-recovery-request signal DEV1_CLKREQN. Similarly, signals transmitted between the channel-switching control circuit 313 and the second PCIe device 332 can also include a second presence status signal DEV2_REQ #, a second reset signal DEV2_PERSTN, and a second clock-recovery-request signal DEV2_CLKREQN.

A reset signal, e.g., DEV1_PERSTN or DEV2_PERSTN, can instruct a PCIe device to send a communication link establishment signal to the host device 320. For example, the reset signal includes an resetn assertion pulse. The communication link establishment signal includes a training sequence 1 (TS1) signal. The reset signal is used to instruct the PCIe device to establish a communication link with the host device 320. In this example, when the PCIe device receives the resetn assertion pulse, the PCIe device can send the TS1 signal to the host device 320 according to the resetn assertion pulse to establish a communication link with the host device 320, and can instruct the host device 320 to exit a power-saving state and enter a fully active state (state L0).

A presence status signal, e.g., DEV1_REQ # or DEV2_REQ #, can indicate whether a PCIe device is coupled to (e.g, plugged into or connected to) a port of the PCIe channel switch 310. For example, when a PCIe device 331 is connected to the port A, the presence status signal DEV1_REQ #received at the channel-switching control circuit 313 is valid and indicates that the PCIe device 331 is in place. If the presence status signal DEV1_REQ #received at the channel-switching control circuit 313 is invalid, then it indicates that no PCIe device is connected to the port A (or the first PCIe device 331 is not in place or is not turned on).

In an embodiment, the presence status signal, e.g., DEV1_REQ # or DEV2_REQ #, can be generated by a PCIe device. For example, the PCIe device can detect whether it is connected to the PCIe channel circuit 311A; and, when the PCIe device detects that it is connected to the PCIe channel circuit 311A, it generates a presence status signal to indicate that.

In an embodiment, signals transmitted between the channel-switching control circuit (e.g., 313 or 213) and the host device 320 also include a hot-plug-event signal HOT_PRSNTN. The hot-plug-event signal HOT_PRSNTN can be generated based on a plug-in or connection status of the PCIe channels (e.g., 311-1 and 311-3, or 21_1-21_N) and an on/off state of the PCIe channels. More specifically, if at least one PCIe channel of the PCIe channels has a PCIe device plugged into it and the at least one PCIe channel is turned on, then the hot-plug-event signal HOT_PRSNTN is set to a first state, e.g., logic low (or logic high); otherwise, the hot-plug-event signal HOT_PRSNTN is set to a second state, e.g., logic high (or logic low).

In an embodiment, the pin of the PCIe channel switch 310 for transmitting the hot-plug-event signal HOT_PRSNTN can be connected to a general purpose I/O pin (GPIO) of the host device 320. Additionally, the GPIO pin can be configured as an input-only pin.

In an embodiment, the channel-switching control circuit 313 can receive an external channel-switching signal EXT_SW_CTL. The signal EXT_SW_CTL can be used to indicate an expected state of the PCIe channels 311-1 and 311-3. The channel-switching control circuit 313 can also turn the the PCIe channels 311-1 and 311-3 on and off according to the signal EXT_SW_CTL and the plug-in state of each of the PCIe channels. For example, the signal EXT_SW_CTL can control the channel-switching control circuit 313 to turn on a selected PCIe channel of the PCIe channels and turn off the rest of the PCIe channels. The host device 320 can establish a communication link and communicate with the PCIe device corresponding to the selected PCIe channel through the selected PCIe channel.

In the embodiment of FIG. 3A (1), the PCIe channel circuit 311A includes two PCIe channels. However, the invention is not so limited. In another embodiment, the PCIe channel circuit includes more than two PCIe channels. For example, as shown in FIG. 3A (2), a PCIe channel circuit 311B includes PCIe channels 31_1-31_N. In the example of FIG. 3A (2), the signal EXT_SW_CTL can cause the PCIe channel circuit 311B to select a PCIe channel to be turned on and turn off the rest of the PCIe channels 31_1-31_N. For example, the PCIe channel circuit 311B can turn on the PCIe channel 31_1 and turn off the PCIe channels 31_2-31_N so that the host device can communicate with an electroic device through the PCIe channel 31_1. For another example, the PCIe channel circuit 311B can turn on PCIe channels 31_1 and 31_2 and turn off the PCIe channels 31_3-31_N so that the host device can communicate with an electronic device through a PCIe channel consisting of the PCIe channels 31_1 and 31_2.

In FIG. 3A (1), the parameter configuration circuit 315 can be configured to receive a parameter configuration signal PARAMETER_CFG, which can include an operating-mode-configuration signal. The operating-mode-configuration signal (e.g., PARAMETER_CFG) can be used to instruct the channel-switching control circuit 313 to operate in an operating mode of a specified operating mode set. The specified operating mode set includes at least one mode of an external channel-switching-control mode and an internal automatic-channel-switching-control mode and may include other modes. Therefore, the parameter configuration circuit 315 can be used to configure the operating mode of the channel-switching control circuit 313. If the host device 320 supports a hot-plug function, the specified operating mode set includes the external channel-switching-control mode and the internal automatic-channel-switching-control mode. If the host device 320 does not support a hot-plug function, the specified operating mode set includes the external channel-switching-control mode but not the internal automatic-channel-switching-control mode.

In an embodiment, the PCIe channel switch 310 may be electrically connected to multiple PCIe devices through respective PCIe channels. The parameter configuration signal PARAMETER_CFG can further include a priority signal that indicates communication priority levels of the PCIe devices coupled to the PCIe channels. The channel-switching control circuit 313 can receive the priority signal (e.g., PARAMETER_CFG) from the parameter configuration circuit 315, and determine the communication priority level of each of the PCIe devices according to the priority signal. In an embodiment, the priority signal (e.g., PARAMETER_CFG) includes a first priority signal and a second priority signal. The first priority signal is used to indicate that the priority levels of the PCIe devices are the same. The second priority signal is used to indicate that a specified PCIe device (e.g., 332) in the PCIe devices coupled to the PCIe channels has the highest communication priority.

In the example of FIG. 3A (1), the port A of the PCIe channel circuit 311A can connect to a first electronic device 351 through a first PCIe device 331 and a first application-function device 341. The port B of the PCIe channel circuit 311A can connect to a second electronic device 352 through a second PCIe device 332 and a second application-function device 342. In an embodiment, a combined circuit of a PCIe device and an application-function device can constitute or be a part of a host controller based on the PCIe interface. For example, the first PCIe device 331 and the first application-function device 341 can perform PCIe-SD interface conversion, and therefore the combined circuit that includes the first PCIe device 331 and the first application-function device 341 can constitute or be a part of a PCIe-to-SD host controller.

The first electronic device 351 can be an embodiment of the first electronic device 25_1. The second electronic device 352 can be an embodiment of the second electronic device 25_2. In an embodiment, the PCIe device, the application-function device, and the electronic device can be included in one device. For example, the first PCIe device 331, the first application-function device 341, and the first electronic device 351 can be included in an SD card. In another embodiment, the PCIe device and the application-function device can be included in the PCIe channel switch 310, and the electronic device can be included in one device. For example, the first PCIe device 331 and the first application-function device 341 can be included in the PCIe channel switch 310, and the first electronic device 351 can be included in an SD card.

In an embodiment, the first electronic device 351 and the second electronic device 352 are two independent/separate devices. In another embodiment, the first electronic device 351 and the second electronic device 352 are the same device. Specifically, the first application-function device 341 and the second application-function device 342 can be connected to the same electronic device. For example, an SD card can be connected to both the first application-function device 341 and the second application-function device 342.

As shown in FIG. 3A (1), the combined circuit of the channel-switching control circuit 313 and the parameter configuration circuit 315 can control the on/off state of each PCIe channel in the PCIe channel circuit 311A. Specifically, the parameter configuration circuit 315 can receive the parameter configuration signal PARAMETER_CFG and instruct the channel-switching control circuit 313 to operate in the operating mode indicated by the operating-mode-configuration signal (e.g., PARAMETER_CFG). By way of example, if the specified operating mode set includes the external channel-switching-control mode and the internal automatic-channel-switching-control mode, then the operating-mode-configuration signal (e.g., PARAMETER_CFG) can cause the channel-switching control circuit 313 to operate in the external channel-switching-control mode or in the internal automatic-channel-switching-control mode.

FIG. 3A (3) illustrates a block diagram of an example of a data transmission system 300-3, in another embodiment of the present invention. FIG. 3A (3) is described in combination with FIG. 2, FIG. 3A (1), and FIG. 3A (2). The data transmission system 300-3 in FIG. 3A (3) is similar to the data transmission system 300 in FIG. 3A (1) except that the data transmission system 300-3 further includes a mechanical switch 350. A user can operate the mechanical switch 350 such that the mechanical switch 350 generates a mechanical channel-switching signal MEC_SW_CTL.

More specifically, in the example of FIG. 3A (3), the channel-switching control circuit 313-3 can receive a channel-switching signal HOST_SW_CTL from the host device 320, receive a channel-switching signal MEC_SW_CTL from the mechanical switch 350, and select the external channel-switching signal EXT_SW_CTL from the signals HOST_SW_CTL and MEC_SW_CTL based on the priority levels of the signals HOST_SW_CTL and MEC_SW_CTL. For example, the priority level of the signal MEC_SW_CTL can be set to be higher than that of the signal HOST_SW_CTL. In this situation, the signal MEC_SW_CTL can overwrite the signal HOST_SW_CTL. The channel-switching control circuit 313 selects the signal MEC_SW_CTL to function as the external channel-switching signal EXT_SW_CTL and controls the on/off state of the PCIe channels 311-1 and 311-3 according to the signal MEC_SW_CTL. As a result, a user can operate the PCIe channel switching by operating the mechanical switch 350, which can increase the flexibility of controlling the PCIe channel switch 310-3. For another example, the priority level of the signal HOST_SW_CTL can be set to be higher than that of the signal MEC_SW_CTL. In this situation, the channel-switching control circuit 313 selects the signal HOST_SW_CTL to function as the external channel-switching signal EXT_SW_CTL and controls the on/off state of the PCIe channels 311-1 and 311-3. If a signal MEC_SW_CTL is generated from the mechanical switch 350, the channel-switching control circuit 313-3 can ingore the signal MEC_SW_CTL. As a result, a PCIe channel switching process caused by mistakenly operating the mechanical switch can be avoided.

Figure 3B:
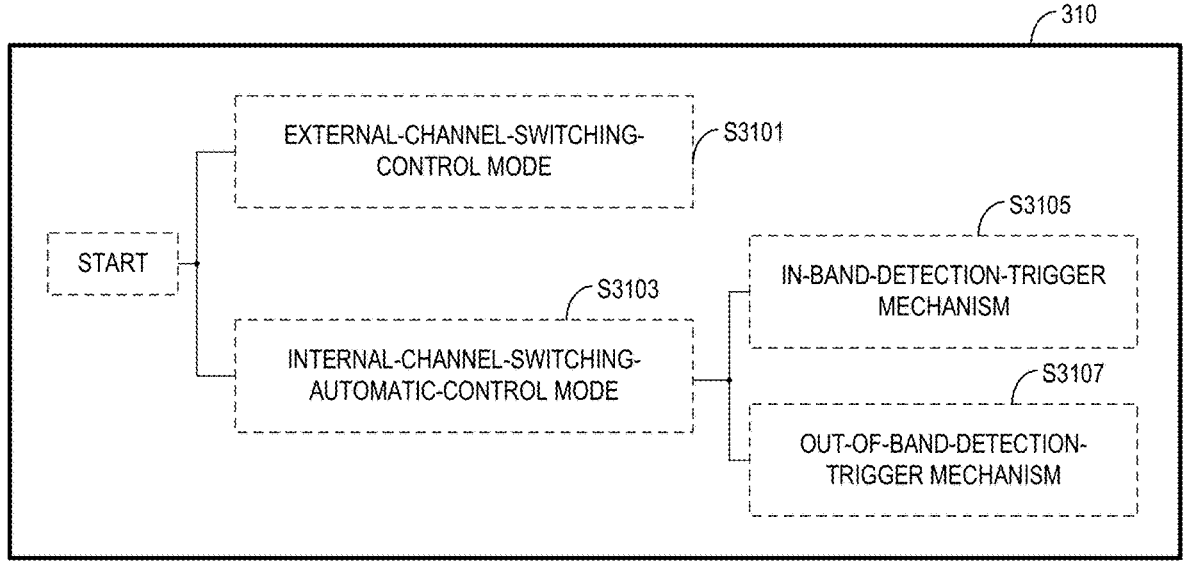
FIG. 3B illustrates a diagram of examples of operating modes and trigger mechanisms of a PCIe channel switch, in an embodiment of the present invention.

FIG. 3B illustrates a diagram of examples of operating modes and trigger mechanisms or modes of the PCIe channel switch 310, in an embodiment of the present invention. FIG. 3B is descrbed in combination with FIG. 2, FIG. 3A (1), and FIG. 3A (2). As shown in FIG. 3B, when the PCIe channel switch 310 starts to operate, it can be configured to operate in an external channel-switching-control mode S3101 or in an internal automatic-channel-switching-control mode S3103, based on the operation-mode-configuration signal (e.g., PARAMETER_CFG). In the internal automatic-channel-switching-control mode S3103, the PCIe channel switch 310 can further operate in an in-band-detection-trigger mechanism S3105 or an out-of-band-detection-trigger mechanism S3107. The in-band-detection-trigger mechanism and out-of-band-detection-trigger mechanism can also be referred to as an "in-band presence-detection mechanism" and "out-of-band presence-detection mechanism" respectively.

In some embodiments, the hot-plug-event signal HOT_PRSNTN is used in the out-of-band-detection-trigger mechanism. The external channel-switching signal EXT_SW_CTL can be used in the external channel-switching-control mode. The first presence status signal DEV1_REQ #, the second presence status signal DEV2_REQ #, the first reset signal DEV1_PERSTN, the second reset signal DEV2_PERSTN, the first clock-recovery-request signal DEV1_CLKREQN, the second clock-recovery-request signal DEV2_CLKREQN, the clock-recovery-request signal CLKREQN, and the reset signal PERSTN can be used in both the external channel-switching-control mode and the internal automatic-channel-switching-control mode.

The external channel-switching-control mode will be described with reference to FIG. 3A (1), FIG. 3A (2), FIG. 3B, and FIG. 3C. In the external channel-switching-control mode, regardless of whether the host device 320 supports a hot-plug function or not, the channel-switching control circuit 313 can control the PCIe channels to enable the host device 320 to communicate with an electronic device, e.g., 351 or 352, through the PCIe channel switch 310.

Figure 3C:
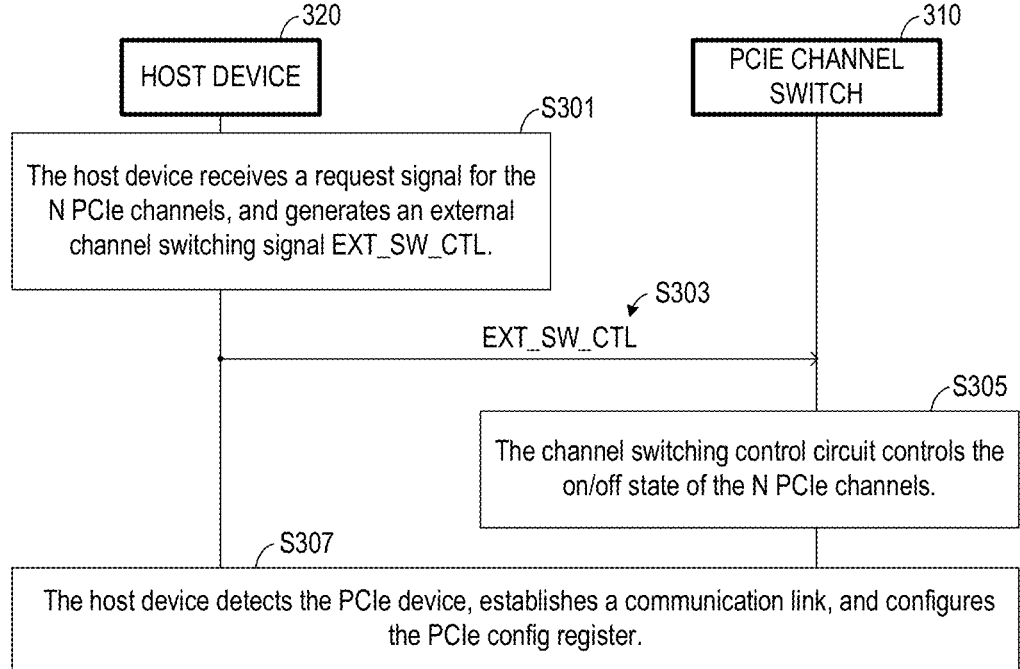
FIG. 3C illustrates an example of a flowchart for a PCIe channel switch interacting with a host device, in an embodiment of the present invention.

FIG. 3C illustrates an example of a flowchart for a PCIe channel switch 310 interacting with a host device 320, in an embodiment of the present invention. Although specific steps are disclosed in FIG. 3C, such steps are examples for illustrative purposes. That is, embodiments according to the present invention are well-suited to performing various other steps or variations of the steps recited in FIG. 3C. FIG. 3C is described in combination with FIG. 2, FIG. 3A (1), FIG. 3A (2), and FIG. 3B. In the example of FIG. 3B, the channel-switching control circuit 313 operates in the external channel-switching-control mode.

At step S301, the software system 324 of the host device 320 receives a request signal for PCIe channels (e.g., 311-1 and 311-3 in FIG. 3A (1), or 31_1-31_N in FIG. 3A (2)), and generates an external channel-switching signal EXT_SW_CTL according to the request signal and communication priority levels of PCIe devices connected to (e.g., plugged into) the PCIe channels. In this step, the external channel-switching signal EXT_SW_CTL is used to indicate an expected state of the PCIe channels. That is to say, the external channel-switching signal EXT_SW_CTL can indicate which PCIe channel of the PCIe channels is to be turned on and which PCIe channel is to be turned off.

At step S303, the host device 320 sends the external channel-switching signal EXT_SW_CTL to the channel-switching control circuit 313.

At step S305, the channel-switching control circuit 313 controls the on/off state of the PCIe channels according to the external channel-switching signal EXT_SW_CTL and the plug-in state of each PCIe channel.

At step S307, the host device 320 discovers a PCIe device through the turned-on PCIe channel, establishes a communication link with the PCIe device corresponding to the turned-on PCIe channel, and configures the PCIe configuration register.

In the embodiment of FIG. 3C, after the PCIe communication link between the host device 320 and the PCIe device corresponding to the turned-on PCIe channel is established, the upper-layer application in the software system 324 of the host device 320 can perform operations to the PCIe device corresponding to the turned-on PCIe channel without the need to unload and reload drivers.

In the embodiment of in FIG. 3C, the channel-switching control circuit 313 controls the on/off state of the N PCIe channels according to the external channel-switching signal EXT_SW_CTL and the plug-in state of each PCIe channel.

For example, if the external channel-switching signal EXT_SW_CTL indicates to turn off the first PCIe channel 311-1 and the second PCIe channel 311-3, then the channel-switching control circuit 313 turns off the first PCIe channel 311-1 and the second PCIe channel 311-3. The channel-switching control circuit 313 can output the channel control signal SW_CTL to turn off the first PCIe channel 311-1 and the second PCIe channel 311-3.

For another example, if the external channel-switching signal EXT_SW_CTL indicates to turn on the first PCIe channel 311-1 and the second PCIe channel 311-3, then the channel-switching control circuit 313 turns on the first PCIe channel 311-1 and the second PCIe channel 311-3, e.g., via the channel control signal SW_CTL.

For yet another example, if the host device 320 is connected to a PCIe device 331 through the first PCIe channel 311-1, and the external channel-switching signal EXT_SW_CTL indicates to switch (change) from the first PCIe channel 311-1 to the second PCIe channel 311-3, then the channel-switching control circuit 313 turns off the first PCIe channel 311-1 and turns on the second PCIe channel 311-3. This causes the host device 320 to establish a communication link with another PCIe device 332 corresponding to the second PCIe channel 311-3. By way of example, initially, the first PCIe channel 311-1 is turned on and the host device 320 can communicate with the PCIe device 331 through the first PCIe channel 311-1. The channel-switching control circuit 313 receives an external channel-switching signal EXT_SW_CTL indicating to turn on the second PCIe channel 311-3 (e.g., indicating to switch from the first PCIe channel 311-1 to the second PCIe channel 311-3). Then, the channel-switching control circuit 313 can output the channel control signal SW_CTL to turn off the first PCIe channel 311-1 and turn on the second PCIe channel 311-3. The host device 320 can establish a communication link with the PCIe device 332 through the second PCIe channel 311-3. More specifically, the host device 320 can send a REFCLK+/− signal to the PCIe device 332 through the second PCIe channel 311-3, and the host device 320 can further send the clock-recovery-request signal DEV2_CLKREQN and the reset signal DEV2_PERSTN to the PCIe device 332 through the channel-switching control circuit 313. Then, the PCIe device 332 starts the process of establishing a PCIe communication link between the host device 320 and the PCIe device 332. After that PCIe communication link is established, the host device 320 can communicate with the electronic device 352 through the PCIe device 332 and the application-function device 342. In this embodiment, the switching process is initiated by the host device 320 using the external channel-switching signal EXT_SW_CTL. As a result, the host device 320 knows the current state of the PCIe channels, so that the host device 320 does not operate the electronic device 352 through the PCIe channel 311-3 while the channel-switching control circuit 313 is controlling the PCIe channels, thus ensuring that no fault occurs. In an embodiment, the process of controlling the PCIe channels by the channel-switching control circuit 313 in this example can be referred to as switching from the first PCIe channel 311-1 to the second PCIe channel 311-3.

For yet another example, if the host device 320 is connected to a PCIe device 332 through the second PCIe channel 311-3, and the external channel-switching signal EXT_SW_CTL indicates to switch from the second PCIe channel 311-3 to the first PCIe channel 311-1, then the channel-switching control circuit 313 turns off the second PCIe channel 311-3 and turns on the first PCIe channel 311-1. This causes the host device 320 to establish a communication link with the PCIe device 331 corresponding to the first PCIe channel 311-1. By way of example, initially, the second PCIe channel 311-3 is turned on and the host device 320 can communicate with the PCIe device 332 through the second PCIe channel 311-3. The channel-switching control circuit 313 receives an external channel-switching signal EXT_SW_CTL indicating to turn on the first PCIe channel 311-1. Then, the channel-switching control circuit 313 can output the channel control signal SW_CTL to turn off the second PCIe channel 311-3 and turn on the first PCIe channel 311-1. The host device 320 can establish a communication link with the PCIe device 331 through the first PCIe channel 311-1. The process of establishing the communication link between the host device 320 and the PCIe device 331 is similar to the process of establishing the abovementioned communication link between the host device 320 and the PCIe device 332. In an embodiment, the process of controlling the PCIe channels by the channel-switching control circuit 313 in this example can be referred to as switching from the second PCIe channel 311-3 to the first PCIe channel 311-1.

In the abovementioned examples in FIG. 3C, once a PCIe communication link is established between the host device 320 and a PCIe device, e.g., 331 or 332, the upper-level application in the software system 324 of the host device 320 can perform operations on that PCIe device without the need to unload and reload the drivers.

The internal automatic-channel-switching-control mode will be described with reference to FIG. 3A (1), FIG. 3A (2), FIG. 3B, FIG. 4A, FIG. 4B, FIG. 5A, FIG. 5B, FIG. 6A, and FIG. 6B. In the internal automatic-channel-switching-control mode, the host device 320 supports a hot-plug function, and the host device 320 uses the hot-plug function to cooperate with the channel-switching control circuit 313 such that the host device 320 can communicate with an electronic device, e.g., 351 or 352, throught the PCIe channel switch 310.

In an embodiment, when the channel-switching control circuit 313 operates in the internal automatic-channel-switching-control mode and the channel-switching control circuit 313 is coupled to multiple PCIe devices, then the channel-switching control circuit 313 can determine a respective priority level of each of the multiple PCIe devices (or a respective priority level of each PCIe channel) according to the priority signal (e.g., PARAMETER_CFG). Then, the channel-switching control circuit 313 can control the on/off state of the PCIe channels (e.g., 311-1 and 311-3, or 31_1-31_N) according to a respective plug-in state of each PCIe channel and a respective priority level of each PCIe channel, such that the channel-switching control circuit 313 can disconnect from a PCIe device with a lower priority level and connect to another PCIe device with a higher priority level.

In an embodiment, a plug-in state of a PCIe channel indicates whether a PCIe device is plugged into (or connected to) the PCIe channel. The plug-in state includes a device-plugged-in state and a device-unplugged state. Specifically, taking the first PCIe device 331 as an example, when the first PCIe device 331 is connected to the port A (or the first PCIe channel 311-1), the first PCIe channel 311-1 is in the device-plugged-in state. When no PCIe device is connected to the port A, the first PCIe channel 311-1 is in the device-unplugged state. In an embodiment, a plug-in state of a PCIe channel can be indicated by a presence status signal (e.g., DEV1_REQ #, DEV2_REQ #, etc.) of a PCIe device corresponding to the PCIe channel. For example, if the presence status signal indicates that a PCIe device is in place, e.g., connected to a PCIe channel, then the PCIe channel is in the device-plugged-in state. If the presence status signal indicates that no PCIe device is in place (e.g., no PCIe device is connected to the PCIe channel), then the PCIe channel is in the device-unplugged state. For example, if the first presence status signal DEV1_REQ #indicates that the first PCIe device 331 is in place, then the first PCIe channel 311-1 is in the device-plugged-in state.

In an embodiment, in the internal automatic-channel-switching-control mode, the channel-switching control circuit 313 can perform steps 1.1, 1.2, and 1.3 as follows.

At step 1.1, the channel-switching control circuit 313 receives a hot-plug-notification-mechanism-configuration signal. The hot-plug-notification-mechanism-configuration signal is used to cause the channel-switching control circuit 313 to operate through at least one mechanism of the in-band-detection-trigger mechanism and the out-of-band-detection-trigger mechanism, to trigger the host device 320 to obtain the plug-in states of the PCIe channels (e.g., 311-1 and 311-3, or 31_1-31_N).

At step 1.2, when the channel-switching control circuit 313 employs the in-band-detection-trigger mechanism, the channel-switching control circuit 313 controls the on/off state of the PCIe channels according to the priority levels of the PCIe devices plugged into the PCIe channels and the plug-in state of each PCIe channel. Operations of the in-band-detection-trigger mechanism include sending an in-band-detection trigger signal, e.g., a clock-recovery-request signal CLKREQN, which triggers the host device 320 to check the plug-in states of the PCIe channels.

At step 1.3, when the channel-switching control circuit 313 employs the out-of-band-detection-trigger mechanism, the channel-switching control circuit 313 controls the on/off state of the PCIe channels according to the priority levels of the PCIe devices plugged into the PCIe channels and the plug-in state of each PCIe channel. Operations of the out-of-band-detection-trigger mechanism include sending a hot-plug-event signal HOT_PRSNTN to the host device 320. The hot-plug-event signal HOT_PRSNTN is generated based on a plug-in state of the PCIe channels and the on/off state of the PCIe channels.

In other words, when the channel-switching control circuit 313 operates in the internal automatic-channel-switching-control mode, the channel-switching control circuit 313 can select at least one mechanism of the in-band-detection-trigger mechanism and the an out-of-band-detection-trigger mechanism to trigger the host device 320 to obtain the plug-in state of the PCIe channels, so that the PCIe channel switch 310 and the host device 320 can cooperate with each other to switch the PCIe channel.

In an embodiment, when using the in-band-detection-trigger mechanism, the channel-switching control circuit 313 can trigger the host device 320 to repeatedly and periodically check the plug-in states of the PCIe channels so that the host device 320 can detect whether there is a PCIe hot-insertion event or a PCIe hot-removal event. When using the out-of-band-detection-trigger mechanism, the channel-switching control circuit 313 can inform the host device 320 of a PCIe hot insertion event through the hot-plug-event signal HOT_PRSNTN.

Examples of operations of the in-band-detection-trigger mechanism in the internal automatic-channel-switching-control mode can be found in FIG. 4A, FIG. 5A, and FIG. 6A described below.

Figure 4A:
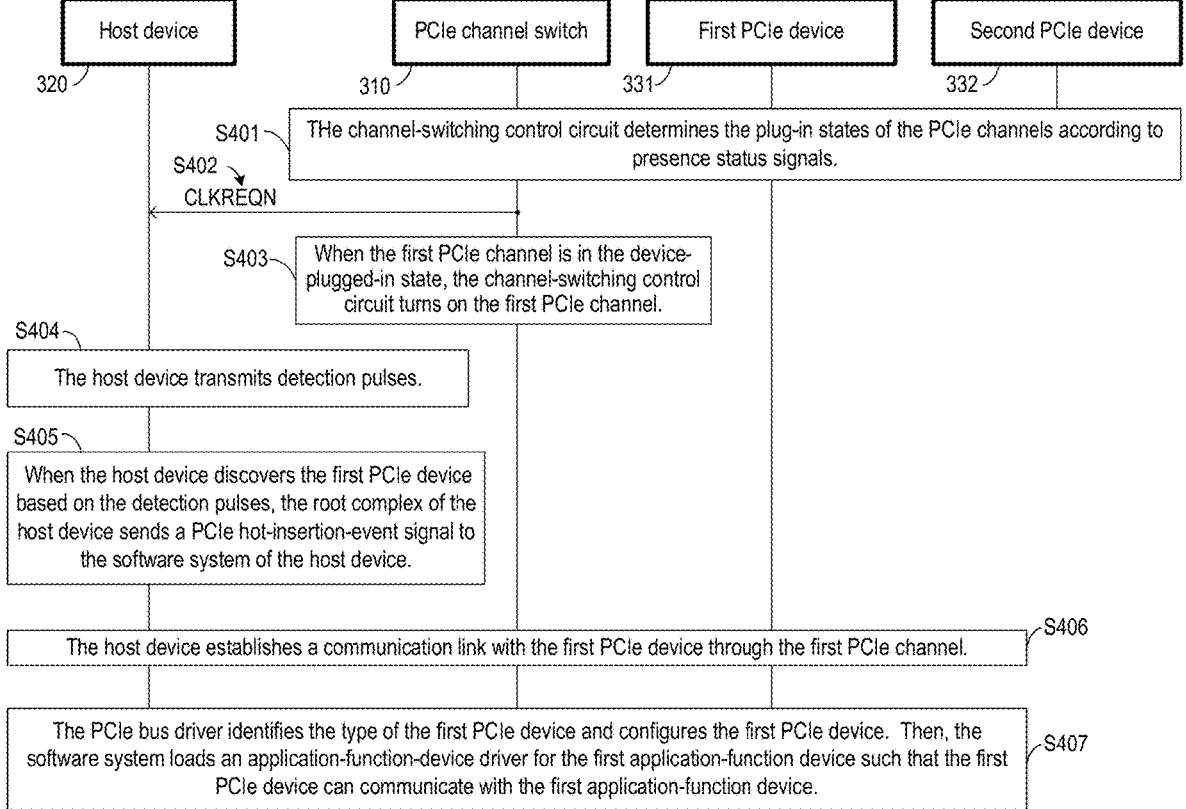
FIG. 4A illustrates an example of a flowchart for a PCIe channel switch interacting with a host device and multiple PCIe devices, in an embodiment of the present invention.

FIG. 4A illustrates an example of a flowchart for a PCIe channel switch 310 interacting with a host device 320 and multiple PCIe devices (e.g., including 331 and 332), in an embodiment of the present invention. Although specific steps are disclosed in FIG. 4A, such steps are examples for illustrative purposes. That is, embodiments according to the present invention are well-suited to performing various other steps or variations of the steps recited in FIG. 4A. FIG. 4A is described in combination with FIG. 2, FIG. 3A (1), FIG. 3A (2), and FIG. 3B. In the example of FIG. 4A, before the operations in the flowchart start, all the PCIe channels (e.g., 311-1 and 311-3 in FIG. 3A (1), or 31_1-31_N in FIG. 3A (2)) are turned off. In this situation, a PCIe device (e.g., 331) is plugged into a PCIe channel (e.g., 311-1) of the PCIe channels.

At step S401, the channel-switching control circuit 313 receives presence status signals (e.g., including DEV1_REQ # and DEV2_REQ #), and determines the plug-in states of the PCIe channels according to the presence status signals.

At step S402, the channel-switching control circuit 313 sends a clock-recovery-request signal CLKREQN to the host device 320.

At step S403, a PCIe device (e.g., 331) is plugged into a first PCEe channel (e.g., the PCIe channel 311-1), and the channel-switching control circuit 313 can detect that the first PCIe channel is in the device-plugged-in state. When the first PCIe channel is in the device-plugged-in state, the channel-switching control circuit 313 turns on the first PCIe channel, e.g., using the channel control signal SW_CTL.

At step S404, in response to receiving the clock-recovery-request signal CLKREQN, the host device 320 transmits successive PCIe-device-detection pulses to detect whether a PCIe device is connected to the turned-on PCIe channel (e.g., the first PCIe channel). That is, in an embodiment, the host device 320 sends a first PCIe-device-detection pulse to the turned-on PCIe channel, then a second PCIe-device-detection pulse to the turned-on PCIe channel, and so on. The host device 320 repeats transmitting a PCIe-device-detection pulse to the turned-on PCIe channel at a preset frequency until the request signal CLKREQN is deactiavted. More specifically, in an embodiment, the request signal CLKREQN is active low. The root complex 321 of the host device 320 can transmit successive PCIe-device-detection pulses to the turned-on PCIe channel when the request signal CLKREQN is logic low, and stops transmitting the PCIe-device-detection pulses when the request signal CLKREQN is logic high. If a PCIe device is plugged into the turned-on PCIe channel, then the root complex 321 can discover that PCIe device via the PCIe channel based on the PCIe-device-detection pulses. In an embodiment, the request signal CLKREQN can remain active until the data transmission system 300 enters a low-power mode, e.g., a power-saving mode, an idle mode, or the like.

At step S405, when the first PCIe channel (e.g., the PCIe channel 311-1) is turned on, the root complex 321 of the host device 320 can discover the first PCIe device (e.g., the PCIe device 331) based on the PCIe-device-detection pulses. Thus, the root complex 321 of the host device 320 sends a PCIe hot-insertion-event signal 325 to the software system 324 of the host device 320.

At step S406, the host device 320 establishes a communication link with the first PCIe device through the first PCIe channel.

At step S407, a PCIe bus driver of the host device 320 (e.g., a PCIe bus driver in the software system 324) identifies the type of the first PCIe device and configures the first PCIe device. Then, the software system 324 loads an application-function-device driver of for the first application-function device 341 connected to the first PCIe device such that the first PCIe device can communicate with a first application-function device (e.g., the application-function-device 341). In an embodiment, the software system 324 can load a software driver such as an application-function-device driver and a PCIe bus driver from a memory of the host device 320. As a result, the host device 320 can communicate with a first electronic device (e.g., the electronic device 351), through the PCIe channel switch 310, the first PCIe device, and the first application-function device.

More specifically, in an embodiment, when the root complex 321 of the host device 320 discovers the first PCIe device, it can report a PCIe hot-insertion-event signal 325 to the software system 324, which indicates that a PCIe hot-insertion event is occurring or has occurred. In response to the PCIe hot-insertion-event signal 325, the PCIe bus driver of the host device 320 can identify the type of the first PCIe device and configure the first PCIe device. Then, the software system 324 of the host device 320 can load an application-function-device driver for the first application-function device connected to the first PCIe device. For example, if the first application-function device is an SD host controller, then the application-function-device driver for the first application-function device is an SD host driver. In this example, after loading the application-function-device driver, the first PCIe device cooperates with the first application-function device to enable the host device 320 to communicate with the first electronic device (e.g., the electronic device 351) through the communication link established at step S406.

FIG. 5A (including part I and part II) illustrates an example of a flowchart for a PCIe channel switch 310 interacting with a host device 320 and multiple PCIe devices (e.g., including 331 and 332), in an embodiment of the present invention. Although specific steps are disclosed in FIG. 5A, such steps are examples for illustrative purposes. That is, embodiments according to the present invention are well-suited to performing various other steps or variations of the steps recited in FIG. 5A. FIG. 5A is described in combination with FIG. 2, FIG. 3A (1), FIG. 3A (2), and FIG. 3B. In the example of FIG. 5A, before the operations in the flowchart start, a first PCIe channel (e.g., 311-1) has been turned on and a first communication link between the host device 320 and a first PCIe device (e.g., 331) has been established through the first PCIe channel. In this situation, a second PCIe device (e.g., 332) with a priority level higher than that of the first PCIe device is plugged into the PCIe channel switch 310.

At step S501, the channel-switching control circuit 313 receives presence status signals (e.g., including DEV1_REQ # and DEV2_REQ #), and determines the plug-in states of the PCIe channels according to the presence status signals.

At step S502, the channel-switching control circuit 313 can detect that the second PCIe channel is in the device-plugged-in state when the second PCIe device is plugged into the PCIe channel switch 310. When the second PCIe channel is in the device-plugged-in state, the channel-switching control circuit 313 can activate the previously established first communication link between the host device 320 and the first PCIe device.

More specifically, at step S502, the channel-switching control circuit 313 can output a clock-recovery-request signal, e.g., CLKREQN, to activate the host device 320. Similar to the request signal CLKREQN in FIG. 4A, the request signal CLKREQN in FIG. 5A can cause the host device 320 to transmit a PCIe-device-detection pulse to a turned-on PCIe channel repeatedly and periodically until the request signal CLKREQN is deactivated. In addition, the channel-switching control circuit 313 can send a clock-recovery-request signal (e.g., DEV1_CLKREQN) to the first PCIe device, e.g., 331, corrresponding to the first PCIe channel, e.g., 311-1, that is turned on. In response to receiving the request signal DEV1_CLKREQN at logic low, the first PCIe device can trigger the host device 320 to activate the previously established communication link. In an embodiment, both the request signals CLKREQN and DEV1_CLKREQN are active low. In other words, the request signals CLKREQN and DEV1_CLKREQN at logic low can activate the first communication link to enter a fully active state (L0). Advantageously, regardless of what state the first communication link is in prior to step S502 (e.g., a power-saving state (L1), a standby state (LOs), or a fully active state (L0)), the first communication link can be active after step S502, thereby ensuring that the channel switching process described in the following steps can be properly performed.

At step S503, the channel-switching control circuit 313 turns off the first PCIe channel and starts a timer for a preset time interval Δt. During the preset time interval Δt, the channel-switching control circuit 313 keeps the first PCIe channel (e.g., 311-1) and the second PCIe channel (e.g., 311-3) turned off.

At step S504, after receiving the request signal, e.g., CLKREQN (e.g., after step S502), the host device 320 transmits successive PCIe-device-detection pulses to a turned-on PCIe channnel if there is a turned-on PCIe channel, to detect whether there is a PCIe device connected to the PCIe channel switch 310. In an embodiment, step S504 is performed by the host device 320, and step S503 is performe by the PCIe channel switch 310. Step S504 may be performed before or after step S503.

At step S505, when the host device 320 detects that the first PCIe channel is turned off, the root complex 321 of the host device 320 sends a hot-removal-event signal 326 to the software system 324 of the host device 320.

At step S506, in response to receiving the hot-removal-event signal 326, the software system 324 of the host device 320 unloads the previously loaded devices, e.g., including the PCIe bus driver of the first PCIe device and the application-function-device driver for a first application-function device (e.g., 341).

At step S507, the channel-switching control circuit 313 turns on the second PCIe channel after the preset time interval Δt (e.g., mentioned in step S503) expires. In an embodiment, the preset time interval Δt is a configurable parameter. The preset time interval Δt is determined and set such that the software system 324 completes the unloading of the PCIe bus driver of the first PCIe device and the application-function-device driver for the first application-function device within the preset time interval Δt.

At step S508, because the second PCIe channel is on, the root complex 321 of the host device 320 can discover the second PCIe device based on the PCIe-device-detection pulses. Thus, the root complex 321 of the host device 320 sends a PCIe hot-insertion-event signal 325 to the software system 324 of the host device 320.

At step S509, in response to discovering the second PCIe device, the host device 320 establishes a second communication link with the second PCIe device through the second PCIe channel. The software system 324 of the host device 320 also loads a PCIe bus driver of the second PCIe device.

At step S510, in response to the PCIe hot-insertion-event signal 325, the PCIe bus driver in the software system 324 identifies the type of the second PCIe device and configures the second PCIe device. Then, the software system 324 loads an application-function-device driver (e.g., an NVMe driver) for a second application-function device (e.g., 342) connected to the second PCIe device, so that the second PCIe device can communicate with the second application-function device. As a result, the host device 320 can communicate with an electronic device, e.g., 352, through the PCIe channel switch 310, the second PCIe device, and second application-function device.

Accordingly, in an embodiment, the PCIe channel switch 310 can cooperate with the host device 320 to perform the steps in FIG. 5A, thereby switching from a first PCIe channel (e.g., 311-1) to a second PCIe channel (e.g., 311-3) when a second PCIe device (e.g., 332) with a higher priority level is plugged into the second PCIe channel.

FIG. 6A (including part I and part II) illustrates an example of a flowchart for a PCIe channel switch 310 interacting with a host device 320 and multiple PCIe devices (e.g., including 331 and 332), in an embodiment of the present invention. Although specific steps are disclosed in FIG. 6A, such steps are examples for illustrative purposes.

That is, embodiments according to the present invention are well-suited to performing various other steps or variations of the steps recited in FIG. 6A. FIG. 6A is described in combination with FIG. 2, FIG. 3A (1), FIG. 3A (2), and FIG. 3B. In the example of FIG. 6A, before the operations in the flowchart start, a second PCIe channel (e.g., 311-3) has been turned on and a second communication link between the host device 320 and a second PCIe device (e.g., 332) has been established through the second PCIe channel. The second PCIe device may be, for example, out-of-order. In this situation, a first PCIe device (e.g., 331) is plugged into the PCIe channel switch 310.

At step S601, the channel-switching control circuit 313 receives a device status signal. In an embodiment, the device status signal can be used to indicate whether the second PCIe device (e.g., 332) is out-of-order (e.g., it malfunctions or fails). In an embodiment, a PCIe device can be considered to be out-of-order when, for example (but not limited to): the presence status signal indicates that the PCIe device is not in place (e.g., the PCIe device is unplugged), the PCIe device is damaged, the performance of the PCIe device is degraded (e.g., a performance value of the PCIe device does not satisfy a preset performance value), or the operating temperature of the PCIe device is too high (e.g., an operating temperature of the PCIe device is higher than a preset temperature). For example, if the second presence status signal DEV2_REQ #indicates that the presence state of the second PCIe device is device not in place, it can indicate that the second PCIe device is out-of-order.

At step S602, when determining that the second PCIe device is out-of-order, the channel-switching control circuit 313 turns off the second PCIe channel (e.g., 311-3) and turns on a first PCIe channel (e.g., 311-1), e.g., using the channel control signal SW_CTL.

At step S603, after the first PCIe channel is turned on, the channel-switching control circuit 313 activates a first communication link between the host device 320 and the first PCIe device.

More specifically, at step S603, the channel-switching control circuit 313 can output a clock-recovery-request signal, e.g., CLKREQN, to activate the host device 320. The request signal CLKREQN can cause the host device 320 to transmit a PCIe-device-detection pulse to a turned-on PCIe channel repeatedly and periodically until the request signal CLKREQN is deactivated. In addition, the channel-switching control circuit 313 can send a reset signal DEV1_PERSTN to the first PCIe device (e.g., 331) through the first PCIe channel (e.g., 311-1). The reset signal DEV1_PERSTN can reset the first PCIe device. After the reset is done, the channel-switching control circuit 313 can stop the transmission of the reset signal DEV1_PERSTN. The reset of the first PCIe device can trigger the first PCIe device to initiate PCIe link training with the host device 320, so that the first communication link between the host device 320 and the first PCIe device enters a fully active state (L0).

In an embodiment, prior to steps S602 and S603, the host device 320 may be in an idle state, and the second communication link may be in a power-saving state, e.g., the L1 state. In an embodiment, when the established communication link in the PCIe channel switch 310 is in the power-saving state (L1), the PCIe channel switch 310 cannot perform the PCIe channel switching process. In addition, the second PCIe device (e.g., 332) cannot cooperate with the host device 320 to cause the second communication link to return from the power-saving state (L1) to the fully active state (L0) because the second PCIe device is out-of-order in this example. Advantageously, steps S602 and S603 solve this issue. Steps S602 and S603 enable the host device 320 to cooperate with the first PCIe device (e.g., 331) to activate a communication link to enter the fully active state (L0), thereby ensuring that the channel switching process described in the following steps can be performed properly.

At step S604, the channel-switching control circuit 313 determines whether the PCIe channel switch 310 is in a specified condition. In some embodiments, the PCIe channel switch 310 is in the specified condition when the host device 320 is in a process of establishing a communication link in the PCIe channel switch 310, or when the PCIe channel switch 310 has a communication link that is established and is in a fully active state (L0). If the PCIe channel switch 310 is in the specified condition, then the channel-switching control circuit 313 turns off the first PCIe channel (e.g., 311-1), and keeps the first PCIe channel and the second PCIe channel (e.g., 311-3) off for a preset time interval Δt. In an embodiment, the channel-switching control circuit 313 starts a timer for the preset time interval Δt when the first PCIe channel is turned off.

At step S605, after receiving the request signal CLKREQN (e.g., after step S603), the host device 320 transmits successive PCIe-device-detection pulses to a turned-on PCIe channnel if there is a turned-on PCIe channel, to detect whether there is a PCIe device connected to the PCIe channel switch 310. In an embodiment, step S605 is performed by the host device 320, and step S604 is performed by the PCIe channel switch 310. Step S605 may be performed before or after step S604.

At step S606, when the root complex 321 of the host device 320 detects that the first PCIe channel (e.g., 311-1) is turned off, the root complex 321 of the host device 320 sends a PCIe hot-removal-event signal to the software system 324 of the host device 320.

At step S607, in response to receiving the PCIe hot-removal-event signal 326, the software system 324 of the host device 320 unloads the previously loaded drivers, e.g., includng a PCIe bus driver of the second PCIe device (e.g., 332) and an application-function-device driver for a second application-function device (e.g., 342). In an embodiment, the preset time interval Δt of step S604 is determined and set such that the software system 324 completes the step S607, e.g., including the unloading of the PCIe bus driver and application-function-device driver, within the preset time interval Δt.

At step S608, when the preset time interval Δt expires, the channel-switching control circuit 313 turns on the first PCIe channel.

At step S609, when the first PCIe channel is on, the host device 320 can discover the first PCIe device through the first PCIe channel based on the PCIe-device-detection pulses, and therefore the root complex 321 of the host device 320 sends a PCIe hot-insertion-event signal 325 to the software system 324 of the host device 320.

At step S610, in response to discovering the first PCIe device, the host device 320 establishes a first communication link with the first PCIe device through the first PCIe channel. The software system 324 of the host device 320 also loads a PCIe bus driver for the first PCIe device.

At step S611, in response to the hot-insertion-event signal 325, the PCIe bus driver in the software system 324 identifies the type of the first PCIe device and configures the first PCIe device. Then, the software system 324 loads an application-function-device driver for the first application-function device (e.g., 341) connected to the first PCIe device, so that the first PCIe device can communicate with the first application-function device. As a result, the host device 320 can communicate with an electronic device, e.g., 351, through the PCIe channel switch 310, the first PCIe device, and the first application-function device.

Accordingly, in an embodiment, the PCIe channel switch 310 can cooperate with the host device 320 to perform the steps in FIG. 6A, thereby switching from a second PCIe channel (e.g., 311-3) to a first PCIe channel (e.g., 311-1) even if the PCIe device plugged into the second PCIe channel is out-of-order.

As discussed above, in the internal automatic-channel-switching-control mode, the channel-switching control circuit 313 can operate through the in-band-detection-trigger mechanism (e.g., the abovementioned step 1.2) or the out-of-band-detection-trigger mechanism (e.g., the abovementioned step 1.3). Examples of operations of the in-band-detection-trigger mechanism are presented above with reference to FIG. 4A, FIG. 5A, and FIG. 6A. In an embodiment, when using the out-of-band-detection-trigger mechanism, the channel-switching control circuit 313 can perform steps 1.31, 1.32, and 1.33 as follows.

At step 1.31, if at least one PCIe channel of the PCIe channels (e.g., 311-1 and 311-3 in FIG. 3A (1), or 31_1-31_N in FIG. 3A (2)) is in the device-plugged-in status and the at least one PCIe channel is turned on, then the channel-switching control circuit 313 sets the hot-plug-event signal HOT_PRSNTN to the abovementioned first state (e.g., logic low).

At step 1.32, if all the PCIe channels are in the device-unplugged state, the channel-switching control circuit 313 sets the hot-plug-event signal HOT_PRSNTN to the abovementioned second state (e.g., logic high). If all the PCIe channels are turned off, then the channel-switching control circuit 313 also sets the hot-plug-event signal HOT_PRSNTN to the second state.

At step 1.33, the channel-switching control circuit 313 controls the on/off state of the PCIe channels according to the communication priority levels of the PCIe devices plugged into PCIe channels and the plug-in states of the PCIe channels.

Examples of operations of the in-band-detection-trigger mechanism in the internal automatic-channel-switching-control mode can be found in FIG. 4B, FIG. 5B, and FIG. 6B, described below.

Figure 4B:
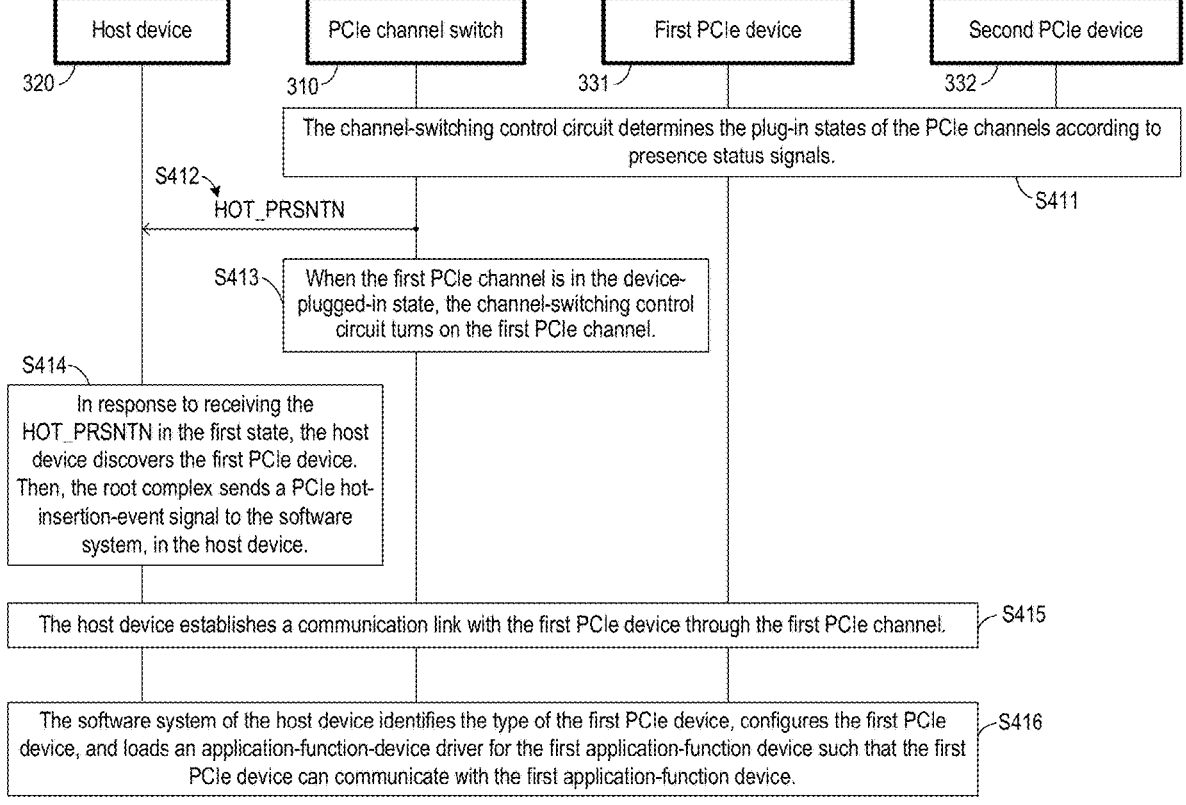
FIG. 4B illustrates an example of a flowchart for a PCIe channel switch interacting with a host device and multiple PCIe devices, in an embodiment of the present invention.

FIG. 4B illustrates an example of a flowchart for a PCIe channel switch 310 interacting with a host device 320 and multiple PCIe devices (e.g., including 331 and 332), in an embodiment of the present invention. Although specific steps are disclosed in FIG. 4B, such steps are examples for illustrative purposes. That is, embodiments according to the present invention are well-suited to performing various other steps or variations of the steps recited in FIG. 4B. FIG. 4B is described in combination with FIG. 2, FIG. 3A (1), FIG. 3A (2), and FIG. 3B. In the example of FIG. 4B, before the operations in the flowchart start, all the PCIe channels (e.g., 311-1 and 311-3 in FIG. 3A (1), or 31_1-31_N in FIG. 3A (2)) are turned off. In this situation, a first PCIe device (e.g., 331) is plugged into to a first PCIe channel (e.g., 311-1) of the PCIe channels.

At step S411, the channel-switching control circuit 313 receives presence status signals (e.g., including DEV1_REQ # and DEV2_REQ #), and determines the plug-in states of the PCIe channels according to the presence status signals.

At step S412, the channel-switching control circuit 313 sends the hot-plug-event signal HOT_PRSNTN to the host device 320. More specifically, the channel-switching control circuit 313 can set the signal HOT_PRSNTN to the abovementioned first state or second state according to the states of the PCIe channels. Step S412 is not necessarily a one-time step. Throughout the operations in the flowchart in FIG. 4B, the channel-switching control circuit 313 can change the state of the signal HOT_PRSNTN in accordance with the changes in the states of the PCIe channels.

At step S413, the first PCIe device (e.g., 331) is plugged into the first PCIe channel (e.g., 311-1), and the channel-switching control circuit 313 can detect that the first PCIe channel is in the device-plugged-in state. Thus, the channel-switching control circuit 313 turns on the first PCIe channel, e.g., using the channel control signal SW_CTL, and sets the signal HOT_PRSNTN to the first state.

At step S414, in response to receiving the hot-plug-event signal HOT_PRSNTN in the first state, the host device 320 can discover the first PCIe device via the first PCIe channel, which is turned on (step S413). Thus, the root complex 321 of the host device 320 sends a PCIe hot-insertion-event signal 325 to the software system 324 of the host device 320.

At step S415, the host device 320 establishes a communication link with the first PCIe device through the first PCIe channel.

At step S416, a PCIe bus driver of the host device 320 (e.g., a PCIe bus driver that is initially loaded in the software system 324) identifies the type of the first PCIe device and configures the first PCIe device. Then, the software system 324 loads an application-function-device driver for a first application-function device (e.g., 341) connected to the first PCIe device, so that the first PCIe device can communicate with the first application-function device. As a result, the host device 320 can communicate with an electronic device, e.g., 351, through the PCIe channel switch 310, the first PCIe device, and the first application-function device.

More specifically, in an embodiment, when the root complex 321 of the host device 320 disovers the first PCIe device (e.g., 331), it can report a PCIe hot-insertion-event signal 325 to the software system 324, which indicates that a PCIe hot-insertion event is occurring or has occurred. In response to the PCIe hot-insertion-event signal 325, the PCIe bus driver of the host device 320 can identify the type of the first PCIe device and configure the first PCIe device. Then, the software system 324 of the host device 320 can load an application-function-device driver for the first application-function device (e.g., 341) connected to the first PCIe device. For example, if the first application-function device is an SD host controller, then the application-function-device driver for the first application-function device is an SD host driver. In this example, after loading the application-function-device driver, the first PCIe device cooperates with the first application-function device to enable the host device 320 to communicate with an electronic device (e.g., 351) through the communication link established at step S416.

FIG. 5B (including part I and part II) illustrates an example of a flowchart for a PCIe channel switch 310 interacting with a host device 320 and multiple PCIe devices (e.g., including 331 and 332), in an embodiment of the present invention. Although specific steps are disclosed in FIG. 5B, such steps are examples for illustrative purposes. That is, embodiments according to the present invention are well-suited to performing various other steps or variations of the steps recited in FIG. 5B. FIG. 5B is described in combination with FIG. 2, FIG. 3A (1), FIG. 3A (2), and FIG. 3B. In the example of FIG. 5B, before the operations in the flowchart start, a first communication link between the host device 320 and a first PCIe device (e.g., 331) has been established. In this situation, a second PCIe device (e.g., 332) that has a priority level higher than that of the first PCIe device is plugged into the PCIe channel switch 310.

At step S511, the channel-switching control circuit 313 receives presence status signals (e.g., including DEV1_REQ # and DEV2_REQ #), and determines the plug-in states of the PCIe channels according to the presence status signals.

At step S512, the channel-switching control circuit 313 sends the hot-plug-event signal HOT_PRSNTN to the host device 320. Similar to the step S411 in FIG. 4B, the step S512 in FIG. 5B is not a one-time step. Throughout the operations in the flowchart in FIG. 5B, the channel-switching control circuit 313 can change the state of the signal HOT_PRSNTN in accordance with the changes in the states of the PCIe channels.

At step S513, the channel-switching control circuit 313 turns off a first PCIe channel (e.g., 311-1) associated with (coupled to) the first PCIe device, and starts a timer for a preset time interval Δt. During the preset time interval Δt, the channel-switching control circuit 313 keeps the first PCIe channel and a second PCIe channel associated with the second PCIe device (e.g., 311-3) turned off. At step S513, the channel-switching control circuit 313 also changes the hot-plug-event signal HOT_PRSNTN from the first state to the second state.

In an embodiment, prior to step S513, the host device 320 may be in an idle state, and the first communication link may be in a power-saving state, e.g., the L1 state. In this situation, the PCIe channel switch 310 cannot perform the PCIe channel switching process. Advantageously, changing the state of the hot-plug-event signal HOT_PRSNTN, e.g., from the first state to the second state, can cause the host device 320 and the first communication link to enter an active state, e.g., the L0 state, thereby ensuring that the channel switching process described in the following steps can be performed properly.

At step S514, in response to receiving the hot-plug-event signal HOT_PRSNTN in the second state, the host device 320 can determine that the first PCIe device is disconnected from the host device 320. Then, the root complex 321 of the host device 320 sends a PCIe hot-removal-event signal 326 to the software system 324 of the host device 320.

At step S515, in response to receiving the PCIe hot-removal-event signal 326, the software system 324 of the host device 320 unloads the previously loaded drivers, e.g., including a PCIe bus driver for the first PCIe device and an application-function-device driver for a first application-function device (e.g., 341) coupled to the first PCIe device.

At step S516, the channel-switching control circuit 313 turns on the second PCIe channel after the preset time interval Δt (e.g., mentioned in step S513) expires. In an embodiment, the preset time interval Δt is a configurable parameter. The preset time interval Δt is determined and set such that the software system 324 completes the unloading of the PCIe bus driver for the first PCIe device and the application-function-device driver for the first application-function device within the preset time interval Δt. At step S516, the channel-switching control circuit 313 also changes the hot-plug-event signal HOT_PRSNTN from the second state to the first state.

At step S517, in response to receiving the hot-plug-event signal HOT_PRSNTN in the first state, the host device 320 can discover a second PCIe device (e.g., 332) via the second PCIe channel, which is turned on (step S516). Thus, the root complex 321 of the host device 320 sends a PCIe hot-insertion-event signal 325 to the software system 324 of the host device 320.

At step S518, in response to discovering the second PCIe device, the host device 320 establishes a second communication link with the second PCIe device through the second PCIe channel. The software system 324 of the host device 320 also loads a PCIe bus driver for the second PCIe device.

At step S519, in response to the PCIe hot-insertion-event signal 325, the PCIe bus driver in the software system 324 identifies the type of the second PCIe device and configures the second PCIe device. Then, the software system 324 loads an application-function-device driver (e.g., NVMe driver) for a second application-function device (e.g., 342) connected to the second PCIe device, so that the second PCIe device can communicate with the second application-function device. As a result, the host device 320 can communicate with an electronic device, e.g., 352, through the PCIe channel switch 310, the second PCIe device, and the second application-function device.

Accordingly, in an embodiment, the PCIe channel switch 310 can cooperate with the host device 320 to perform the steps in FIG. 5B, thereby switching from a first PCIe channel (e.g., 311-1) to a second PCIe channel (e.g., 311-3) when a second PCIe device (e.g., 332) with a higher priority level is plugged into the second PCIe channel.

FIG. 6B (including part I and part II) illustrates an example of a flowchart for a PCIe channel switch 310 interacting with a host device 320 and multiple PCIe devices (e.g., including 331 and 332), in an embodiment of the present invention. Although specific steps are disclosed in FIG. 6B, such steps are examples for illustrative purposes. That is, embodiments according to the present invention are well-suited to performing various other steps or variations of the steps recited in FIG. 6B. FIG. 6B is described in combination with FIG. 2, FIG. 3A (1), FIG. 3A (2), and FIG. 3B. In the example of FIG. 6B, before the operations in the flowchart start, a second communication link between the host device 320 and a second PCIe device (e.g., 332) has been established. The second PCIe device may be out-of-order. In this situation, a first PCIe device (e.g., 331) is plugged into the PCIe channel switch 310.

At step S621, the channel-switching control circuit 313 receives a device status signal. In an embodiment, the device status signal can be used to indicate whether the second PCIe device 332 is out-of-order (e.g., it malfunctions or fails).

At step S622, the channel-switching control circuit 313 sends the hot-plug-event signal HOT_PRSNTN to the host device 320. Similar to the steps S411 and S512, the step S622 is not a one-time step. Throughout the operations in the flowchart in FIG. 6B, the channel-switching control circuit 313 can change the state of the signal HOT_PRSNTN in accordance with the changes in the states of the PCIe channels.

At step S623, when determining that the second PCIe device (e.g., 332) is out-of-order, the channel-switching control circuit 313 turns off a second PCIe channel (e.g., 311-3) corresponding to the second PCIe device, and turns on a first PCIe channel (e.g., 311-1) corresponding to the first PCIe device, e.g., using the channel control signal SW_CTL. More specifically, at step S623, the channel-switching control circuit 313 first turns off the second PCIe channel, and changes the signal HOT_PRSNTN from the first state to the second state. After that, the channel-switching control circuit 313 turns on the first PCIe channel and changes the signal HOT_PRSNTN from the second state to the first state.

In an embodiment, prior to step S623, the host device 320 may be in an idle state, and the second communication link may be in a power-saving state, e.g., the L1 state. In an embodiment, when the established communication link in the PCIe channel switch 310 is in the power-saving state (L1), the PCIe channel switch 310 cannot perform the PCIe channel switching process. In addition, the second PCIe device (e.g., 332) cannot cooperate with the host device 320 to activate the second communication link to return from the power-saving state (L1) to the fully active state (L0), because the second PCIe device is out-of-order. Advantageously, changing of the state of the signal HOT_PRSNTN at step S623 can enable the host device 320 to cooperate with the first PCIe device (e.g., 331) to activate a communication link, thereby ensuring that the channel switching process described in the following steps can be performed properly.

At step S624, the channel-switching control circuit 313 determines whether the PCIe channel switch 310 is in a specified condition. In some embodiments, the PCIe channel switch 310 is in the specified condition when the host device 320 is in a process of establishing a communication link in the PCIe channel switch 310 or when the PCIe channel switch 310 has a communication link that is established and is in a fully active state (L0). If the PCIe channel switch 310 is in the specified condition, then the channel-switching control circuit 313 turns off the first PCIe channel (e.g., 311-1) and keeps the first PCIe channel and the second PCIe channel (e.g., 311-3) turned off for a preset time interval Δt. In an embodiment, the channel-switching control circuit 313 starts a timer for the preset time interval Δt when the first PCIe channel is turned off. In addition, the channel-switching control circuit 313 changes the hot-plug-event signal HOT_PRSNTN from the first state to the second state.

At step S625, in response to receiving the hot-plug-event signal HOT_PRSNTN in the second state, the host device 320 determines that the second PCIe device (e.g., 332) is disconnected from the host device 320. Thus, the root complex 321 of the host device 320 sends a PCIe hot-removal-event signal 326 to the software system 324 of the host device 320.

At step S626, in response to receiving the PCIe hot-removal-event signal 326, the software system 324 of the host device 320 unloads the previously loaded drivers, e.g., including a PCIe bus driver for the second PCIe device and an application-function-device driver for a second application-function device (e.g., 342) coupled to the second PCIe device. In an embodiment, the preset time interval Δt mentioned in step S624 is determined and set such that the software system 324 completes performing step S607 (e.g., including the unloading of the PCIe bus driver and application-function-device driver) within the preset time interval Δt.

At step S627, when the preset time interval Δt expires, the channel-switching control circuit 313 turns on the first PCIe channel (e.g., 311-1).

At step S628, in response to receiving the hot-plug-event signal HOT_PRSNTN in the first state, the host device 320 can discover the first PCIe device via the first PCIe channel, which is turned on (step S627). Thus, the root complex 321 of the host device 320 sends a PCIe hot-insertion-event signal 325 to the software system 324 of the host device 320.

At step S629, in response to discovering the first PCIe device, the host device 320 establishes a first communication link with the first PCIe device through the first PCIe channel. The software system 324 of the host device 320 also loads a PCIe bus driver for the first PCIe device.

At step S630, the software system 324 of the host device 320 obtains or determines the type of the first PCIe device, configures the first PCIe device, and loads the driver of a first application-function device (e.g., 341) connected to the first PCIe device 331, so that the first PCIe device can communicate with the first application-function device.

Accordingly, in an embodiment, the PCIe channel switch 310 can cooperate with the host device 320 to perform the steps in FIG. 6B, thereby switching from a second PCIe channel (e.g., 311-3) to a first PCIe channel (e.g., 311-1) even if the PCIe device plugged into the second PCIe channel is out-of-order.

According to the embodiments illustrated in FIG. 4A, FIG. 4B, FIG. 5A, FIG. 5B, FIG. 6A and FIG. 6B, the PCIe channel switch 310 can trigger the host device 320 to notify the application layer of the system 324 to perform appropriate operations that match the state of the communication link in the PCIe channel switch 310, to avoid failure caused by the application layer being unaware of changes in the state of the communication link, thus ensuring the stability of the system 324 and improving the compatibility of the PCIe channel switch 310.

As mentioned above, e.g., in steps S503, S513, S604, and S624, all the PCIe channels in the PCIe channel switch 310 can remain off during a preset time interval Δt. In an embodiment, the preset time interval Δt is determined and set according to a length of time that the host device 320 takes to unload the drivers that are previously loaded in the system 324. The value of preset time interval Δt can be determined empirically, for example, and may be updated at any time. More specifically, the preset time interval Δt can be set to be equal to or greater than the total time for the host device 320 to completely unload the drivers. As a result, during the process of unloading the drivers, all the PCIe channels can remain off. In other words, when the channel-switching control circuit 313 turns on a PCIe channel after the time interval Δt, the software system 324 of the host device 320 has completed unloading the drivers, thereby ensuring that the host device 320 can establish a communication link correctly.

In an embodiment, if the abovemntioned priority signal (e.g., PARAMETER_CFG) is set to be the first priority signal, and multiple PCIe devices are plugged into the PCIe channel switch 310 through respective PCIe channels, then the channel-switching control circuit 313 can turn on the PCIe channel for the PCIe device that is first plugged into the PCIe channel switch 310. For example, if a first PCIe device (e.g., 331) is plugged into a first PCIe channel (e.g., 311-1) and then a second PCIe device (e.g., 332) is plugged into a second PCIe channel (e.g., 311-3), the channel-switching control circuit 313 can turn on the first PCIe channel 311-1 and turn off the second PCIe channel 311-1.

Although examples of FIG. 4A, FIG. 4B, FIG. 5A, FIG. 5B, FIG. 6A and FIG. 6B are provided, the trigger condition for automatically switching the PCIe channels in the internal automatic-channel-switching-control mode is not so limited. More specifically, in the internal automatic-channel-switching-control mode, the trigger condition that triggers the automatic switching of the PCIe channels may include the plug-in state of the PCIe channels changes, or other conditions (e.g., a malfunction of a PCIe device connected to a PCIe channel). Therefore, if a first PCIe channel is turned on and a switching signal is sent to the channel-switching control circuit 313, then the channel-switching control circuit 313 can trigger the host device 320 to obtain the plug-in state of the PCIe channels according to the switching signal. The switching signal can be used to indicate that the PCIe device connected to the host device 320 is to be switched to (replaced with) a second PCIe device corresponding to a second PCIe channel. Then, the channel-switching control circuit 313 can be configured to turn off all of the PCIe channels and keep all the PCIe channels off for a preset time interval Δt. After the preset time interval Δt expires, the channel-switching control circuit 313 can turn on the second PCIe channel, so that the host device 320 can establish a communication link with the second PCIe device through the second PCIe channel. In an embodiment, triggering the host device 320 to determine the plug-in state of the PCIe channels according to the switching signal may include using at least one mechanism of the in-band-detection-trigger mechanism and the out-of-band-detection-trigger mechanism to trigger the host device 320 to obtain the plug-in state of the PCIe channels.

In an embodiment, the external channel-switching signal EXT_SW_CTL may be generated by the host device 320. For example, an application layer of the host device 320 may send a signal (e.g., a GPIO signal) to the channel-switching control circuit 313 to perform a PCIe channel switching process. The channel-switching control circuit 313 may use that signal as the external channel-switching signal EXT_SW_CTL to control the PCIe channels. In other embodiments, the external channel-switching signal EXT_SW_CTL may be generated by other devices.

In an embodiment, the parameter configuration signal PARAMETER_CFG may be generated by a host device, a PCIe device, etc. Parameter configuration can be performed by methods including, but not limited to: (1) configuring registers via a PCIe interface, (2) configuring registers via chip pins, and (3) pre-storing parameters in an EEPROM (electrically erasable programmable read-only memory) of an I2C interface and then reading the parameters from the EEPROM when the chip is powered on. In this embodiment, through the parameter configuration signal PARAMETER_CFG, the host device 320 can configure the operating mode of the channel-switching control circuit 313 according to the application requirements, and configure the communication priority levels for the PCIe channels.

In an embodiment, in the PCIe channel switch (e.g., 310 or 210), when a PCIe channel of the PCIe channels is selected to be turned on, the channel-switching control circuit (e.g., 313 or 213) can turn off the other PCIe channels, so that the host device (e.g., 320 or 220) can communicate with an electronic device (e.g., 351, 352, 25_1, 25_2, . . . , or 25_N) through the selected PCIe channel. In other words, PCIe data packets are transmitted between the host device and the electronic device through the selected PCIe channel. As a result, when the PCIe channel switch (e.g., 310 or 210) establishes the communication between the host device and the electronic device, the PCIe channel switch (e.g., 310 or 210) does not need to parse and forward PCIe data packets like the conventional PCIe switch 100 (FIG. 1), and therefore does not need to include circuitry that implements the PCIe physical layer and the PCIe link layer. In addition, the switch in the PCIe channel switch (e.g., 310 or 210) can be implemented using a high-speed differential signal switch (e.g., a high-speed analog switch). Accordingly, compared to the conventional PCIe switch 100, the structure of circuits in the PCIe channel switch (e.g., 310 or 210) can be simplified and the manufacturing cost of the PCIe channel switch (e.g., 310 or 210) can be reduced.

Figure 7:
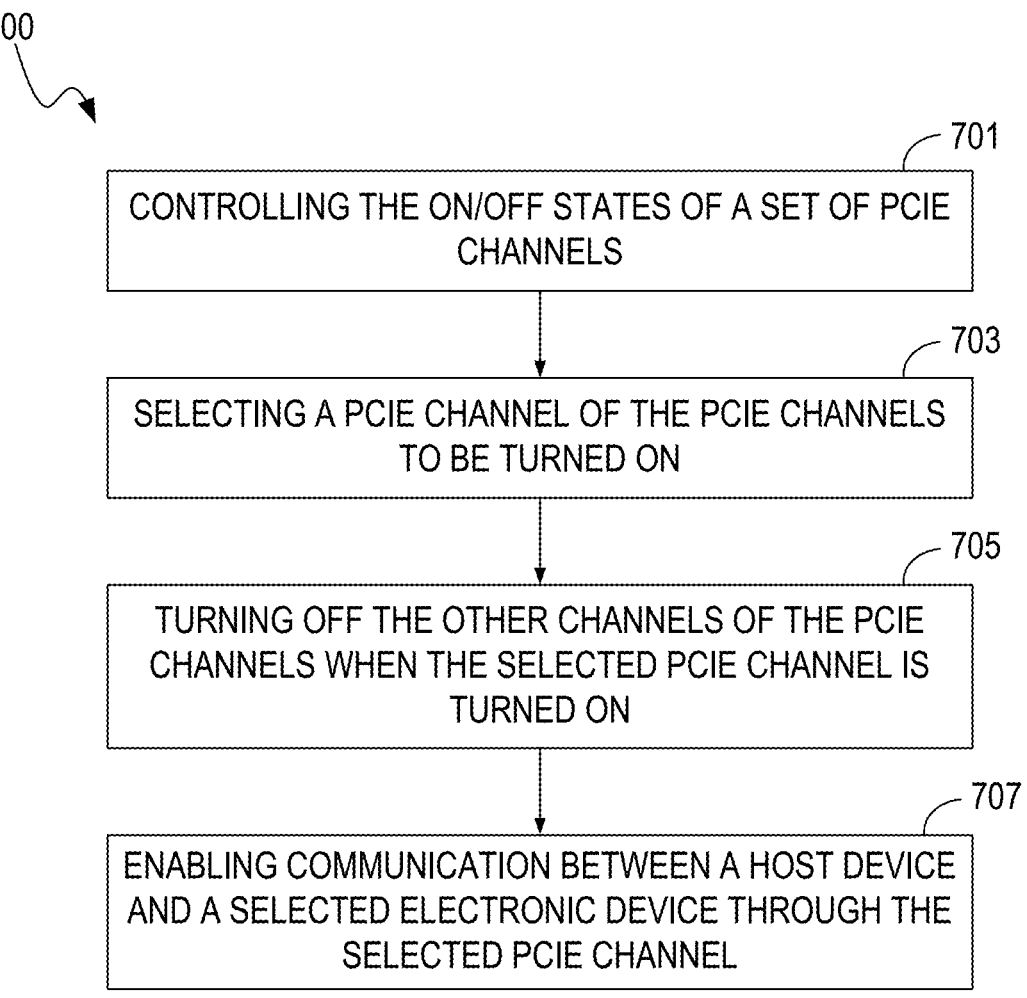
FIG. 7 illustrates an example of a method for controlling PCIe channels in a PCIe channel switch, in an embodiment of the present invention.

FIG. 7 illustrates an example of a method for controlling PCIe channels in a PCIe channel switch (e.g., 210, 310), in an embodiment of the present invention. Although specific steps are disclosed in FIG. 7, such steps are examples for illustrative purposes. That is to say, embodiments according to the present invention are well-suited to perform various other steps or variations of the steps recited in FIG. 7. FIG. 7 is described in combination with FIG. 2, FIG. 3A (1), FIG. 3A (2), FIG. 3B, FIG. 3C, FIG. 4A, FIG. 4B, FIG. 5A, FIG. 5B, FIG. 6A, and FIG. 6B.

At step 701, a control circuit (e.g., 213 or 313) controls of the on/off state of a set of PCIe channels (e.g., 21_1-21_N in FIGS. 2, 311-1 and 311-3 in FIG. 3A (1), or 31_1-31_N in FIG. 3A (2)), in a PCIe channel switch (e.g., 210 or 310). The PCIe channels are operable for connecting to a host device (e.g., 220 or 320). Each PCIe channel of the PCIe channels is operable for connecting the host device with an electronic device (e.g., 25_1, 25_2, . . . , 25_N, 351, or 352) via a respective PCIe device (e.g., 331 or 332).

At step 703, the control circiut selects a PCIe channel of the PCIe channels to be turned on.

At step 705, the control circiut turns off the other channels of the PCIe channels when the selected PCIe channel is on.

At step 707, communication between the host device and a selected electronic device (e.g., 25_1, 25_2, . . . , 25_N, 351, or 352) is enabled through the selected PCIe channel.

An embodiment of the invention further provides an electronic device that includes a processor, a memory, and a PCIe channel switch used for PCIe channel switching. The processor is coupled to the PCIe channel switch, and is used to communicate with external electronic devices through the PCIe channel switch. The PCIe channel switch may include the PCIe channel switch shown in FIG. 2, FIG. 3A (1), or FIG. 3A (2). The electronic device provided by an embodiment of the present invention may include, but is not limited to, a mobile phone, a tablet computer, a notebook computer, a electric vehicle, etc. For example, a PCIe channel switch (e.g., 210 or 310) may be included in (e.g., integrated in) a host device (e.g., 220 or 320) and such a host device is an embodiment of the electronic device mentioned in this paragraph.

While the foregoing description and drawings represent embodiments of the present invention, it will be understood that various additions, modifications, and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

We claim:

1. A peripheral component interconnect express (PCIe) channel switch comprising:

a plurality of PCIe channels operable for connecting to a host device, wherein each PCIe channel of said plurality of PCIe channels is operable for connecting said host device with an electronic device via a respective PCIe device of a plurality of PCIe devices; and a control circuit, coupled to said plurality of PCIe channels, and operable for controlling an on/off state of said each PCIe channel, wherein said control circuit is further operable for selecting a PCIe channel of said plurality of PCIe channels to be turned on and for turning off the other channels of said plurality of PCIe channels when the selected PCIe channel is on, enabling communication between said host device and a selected electronic device through said selected PCIe channel, wherein said control circuit is configured to receive an operating-mode-configuration signal and to operate in a mode of an external channel-switching-control mode and an internal automatic-channel-switching-control mode according to said operating-mode-configuration signal, wherein in said external channel-switching-control mode, said control circuit controls on/off states of said plurality of PCIe channels according to an external channel-switching signal and a plug-in state of said each PCIe channel, and wherein said plug-in state comprises a device-plugged-in state and a device-unplugged state, and wherein said plurality of PCIe channels comprises a first PCIe channel and a second PCIe channel, and wherein in said external channel-switching-control mode:

if said external channel-switching signal indicates turning off said first and second PCIe channels, then said control circuit turns off said first and second PCIe channels;

if said external channel-switching signal indicates switching from said first PCIe channel to said second PCIe channel and said first PCIe channel is in said device-plugged-in state, then said control circuit turns off said first PCIe channel and turns on said second PCIe channel, establishing a communication link between said host device and a PCIe device corresponding to said second PCIe channel; and if said external channel-switching signal indicates switching from said second PCIe channel to said first PCIe channel and said second PCIe channel is in said device plugged-in state, then said control circuit turns off said second PCIe channel and turns on said first PCIe channel, establishing a communication link between said host device and a PCIe device corresponding to said first PCIe channel.

2. A peripheral component interconnect express (PCIe) channel switch comprising:

a plurality of PCIe channels operable for connecting to a host device, wherein each PCIe channel of said plurality of PCIe channels is operable for connecting said host device with an electronic device via a respective PCIe device of a plurality of PCIe devices; and a control circuit, coupled to said plurality of PCIe channels, and operable for controlling an on/off state of said each PCIe channel, wherein said control circuit is further operable for selecting a PCIe channel of said plurality of PCIe channels to be turned on and for turning off the other channels of said plurality of PCIe channels when the selected PCIe channel is on, enabling communication between said host device and a selected electronic device through said selected PCIe channel, wherein said control circuit is configured to receive an operating-mode-configuration signal and to operate in a mode of an external channel-switching-control mode and an internal automatic-channel-switching-control mode according to said operating-mode-configuration signal, wherein in said internal automatic-channel-switching-control mode, said control circuit controls said on/off states of said plurality of PCIe channels according to a respective plug-in state of said each PCIe channel and a respective priority level of said each PCIe channel, and said control circuit is configured to select at least one mechanism of an in-band-detection-trigger mechanism and an out-of-band-detection-trigger mechanism, wherein operations of said in-band-detection-trigger mechanism comprise sending a clock-recovery-request signal to said host device, wherein said host device checks plug-in states of said plurality of PCIe channels, and wherein operations of said out-of-band-detection-trigger mechanism comprise sending to said host device a hot-plug-event signal that is generated based on said plug-in states of said plurality of PCIe channels and said on/off states of said plurality of PCIe channels.

3. The PCIe channel switch of claim 2, wherein said plurality of PCIe channels comprises a first PCIe channel and a second PCIe channel, wherein if turned on said first PCIe channel comprises a first communication link between said host device and a first PCIe device, wherein if turned on said second PCIe channel comprises a second communication link between said host device and a second PCIe device, wherein said in-band-detection-trigger mechanism is selected, and wherein said control circuit is further operable for performing at least one operation of a first operation, a second operation, and a third operation;

wherein said first operation is performed when each PCIe channel of said plurality of PCIe channels is turned off and said first PCIe channel is in said device-plugged-in state, and wherein said first operation comprises turning on said first PCIe channel and establishing said first communication link;

wherein said second operation is performed when said first communication link is established, said second PCIe channel is in said device-plugged-in state, and a priority level of said second PCIe device is higher than a priority level of said first PCIe device, and wherein said second operation comprises controlling said on/off states of said plurality of PCIe channels, disconnecting said first communication link, and establishing said second communication link; and wherein said third operation is performed when said second communication link is established, said second PCIe device is out-of-order, and said first PCIe channel is in said device-plugged-in state, and wherein said third operation comprises controlling said on/off states of said plurality of PCIe channels and establishing said first communication link.

4. The PCIe channel switch of claim 3, wherein in response to said turning on said first PCIe channel in said first operation, a root complex of said host device sends a PCIe hot-insertion-event signal to a software system of said host device, wherein said software system, in response to receiving said PCIe hot-insertion-event signal, loads a driver for an application-function device coupled to said first PCIe device.

5. The PCIe channel switch of claim 3, wherein said second operation further comprises:

turning off said first PCIe channel, causing a root complex of said host device to send a PCIe hot-removal-event signal to a software system of said host device;

starting a timer for a preset time interval when said first PCIe channel is turned off, wherein said software system, in response to receiving said PCIe hot-removal-event signal, unloads a driver for an application-function device coupled to said first PCIe device during said preset time interval; and when said preset time interval expires, turning on said second PCIe channel, causing said root complex of said host device to send a PCIe hot-insertion-event signal to said software system, wherein said software system, in response to receiving said PCIe hot-insertion-event signal, loads a driver for an application-function device coupled to said second PCIe device.

6. The PCIe channel switch of claim 3, wherein said third operation further comprises steps comprising:

(a) turning off said second PCIe channel and turning on said first PCIe channel;

(b1) using said clock-recovery-request signal to activate said host device;

(b2) transmitting a reset signal to said first PCIe device, causing said first PCIe device to send a communication link establishment signal to said host device;

(c) after said step (a), determining whether said PCIe channel switch is in a condition of a first condition and a second condition, wherein said PCIe channel switch is in said first condition when said host device is establishing a communication link in said PCIe channel switch, and wherein said PCIe channel switch is in said second condition when said PCIe channel switch comprises a communication link that is established and is in a fully active state (L0);

(d) if said PCIe channel switch is in a condition of said first condition and said second condition after said step (a), then turning off said first PCIe channel, causing a root complex of said host device to send a PCIe hot-removal-event signal to a software system of said host device;

(e) starting a timer for a preset time interval when said first PCIe channel is turned off in said step (d), wherein said software system, in response to receiving said PCIe hot-removal-event signal, unloads a driver of an application-function device coupled to said second PCIe device during said preset time interval; and (f) when said preset time interval expires, turning on said first PCIe channel, causing said root complex of said host device to send a PCIe hot-insertion-event signal to said software system, wherein said software system, in response to receiving said PCIe hot-insertion-event signal, loads a driver for an application-function device coupled to said first PCIe device.

7. The PCIe channel switch of claim 2, wherein said hot-plug-event signal comprises a first state and a second state, wherein if at least one PCIe channel of said plurality of PCIe channels is in said device-plugged-in state and said at least one PCIe channel is turned on, then said hot-plug-event signal is set to said first state; and otherwise, said hot-plug-event signal is set to said second state.

8. The PCIe channel switch of claim 7, wherein said plurality of PCIe channels comprises a first PCIe channel and a second PCIe channel, wherein if turned on said first PCIe channel comprises a first communication link between said host device and a first PCIe device, wherein if turned on said second PCIe channel comprises a second communication link between said host device and a second PCIe device, wherein said out-of-band-detection-trigger mechanism is selected, and wherein said control circuit is further operable for performing at least one operation of a first operation, a second operation, and a third operation;

wherein said first operation is performed when each PCIe channel of said plurality of PCIe channels is turned off and said first PCIe channel is in said device-plugged-in state, and wherein said first operation comprises turning on said first PCIe channel and establishing said first communication link;

wherein said second operation is performed when said first communication link is established, said second PCIe channel is in said device-plugged-in state, and a priority level of said second PCIe device is higher than a priority level of said first PCIe device, and wherein said second operation comprises controlling said on/off states of said plurality of PCIe channels, disconnecting said first communication link, and establishing said second communication link; and wherein said third operation is performed when said second communication link is established, said second PCIe device is out-of-order, and said first PCIe channel is in said device-plugged-in state, and wherein said third operation comprises controlling said on/off states of said plurality of PCIe channels and establishing said first communication link.

9. The PCIe channel switch of claim 8, wherein said first operation further comprises setting said hot-plug-event signal to said first state, causing a root complex of said host device to send a PCIe hot-insertion-event signal to a software system of said host device, wherein said software system, in response to receiving said PCIe hot-insertion-event signal, loads a driver for an application-function device coupled to said first PCIe device.

10. The PCIe channel switch of claim 8, wherein said second operation further comprises:

turning off said first PCIe channel and setting said hot-plug-event signal to said second state, causing a root complex of said host device to send a PCIe hot-removal-event signal to a software system of said host device;

starting a timer for a preset time interval when said first PCIe channel is turned off, wherein said software system, in response to receiving said PCIe hot-removal-event signal, unloads a driver for an application-function device coupled to said first PCIe device during said preset time interval; and when said preset time interval expires, turning on said second PCIe channel and setting said hot-plug-event signal to said first state, causing said root complex of said host device to send a PCIe hot-insertion-event signal to said software system, wherein said software system, in response to receiving said PCIe hot-insertion-event signal, loads a driver for an application-function device coupled to said second PCIe device.

11. The PCIe channel switch of claim 8, wherein said third operation further comprises:

(a) turning off said second PCIe channel and turning on said first PCIe channel;

(b) after said step (a), determining whether said PCIe channel switch is in a condition of a first condition and a second condition, wherein said PCIe channel switch is in said first condition when said host device is establishing a communication link, and wherein said PCIe channel switch is in said second condition when said PCIe channel switch comprises a communication link that is established and is in a fully active state (L0);

(c) if said PCIe channel switch is in a condition of said first condition and said second condition, then turning off said first PCIe channel, causing a root complex of said host device to send a PCIe hot-removal-event signal to a software system of said host device;

(d) starting a timer for a preset time interval when said first PCIe channel is turned off in said step (c), wherein said software system, in response to receiving said PCIe hot-removal-event signal, unloads a driver for an application-function device coupled to said second PCIe device during said preset time interval; and (e) when said preset time interval expires, turning on said first PCIe channel and setting said hot-plug-event signal to said first state, causing said root complex of said host device to send a PCIe hot-insertion-event signal to said software system, wherein said software system, in response to receiving said PCIe hot-insertion-event signal, loads a driver for an application-function device coupled to said first PCIe device.

12. The PCIe channel switch of claim 1, wherein said control circuit is configured to receive a first channel-switching signal from said host device, to receive a second channel-switching signal generated by operating a mechanical switch coupled to said PCIe channel switch, and to select said external channel-switching signal from said first and second channel-switching signals.

13. A method for controlling a plurality of peripheral component interconnect express (PCIe) channels in a PCIe channel switch, said method comprising:

controlling, using a control circuit in said PCIe channel switch, on/off states of said plurality of PCIe channels, wherein each PCIe channel of said plurality of PCIe channels is operable for connecting to a host device, and wherein said each PCIe channel of said plurality of PCIe channels is operable for connecting said host device with an electronic device via a respective PCIe device of a plurality of PCIe devices;

selecting a PCIe channel of said plurality of PCIe channels to be turned on;

turning off the other channels of said plurality of PCIe channels when said selected PCIe channel is turned on; and enabling communication between said host device and a selected electronic device through said selected PCIe channel, wherein a respective plug-in state of said each PCIe channel comprises a device-plugged-in state and a device-unplugged state, wherein said plurality of PCIe channels comprises a first PCIe channel and a second PCIe channel, and wherein said method further comprises:

when a communication link is established between said host device and a first PCIe device of said plurality of PCIe devices and corresponding to said first PCIe channel, when said second PCIe channel is in said device-plugged-in state, and when a priority level of a second PCIe device of said plurality of PCIe devices and corresponding to said second PCIe channel is higher than a priority level of said first PCIe device, performing a plurality of steps comprising:

turning off said first PCIe channel, wherein a root complex of said host device sends a PCIe hot-removal-event signal to a software system of said host device in response to said turning off said first PCIe channel;

starting a timer for a preset time interval when said first PCIe channel is turned off, wherein said software system, in response to receiving said PCIe hot-removal-event signal, unloads a driver for an application-function device coupled to said first PCIe device during said preset time interval; and when said preset time interval expires, turning on said second PCIe channel to cause said root complex of said host device to send a PCIe hot-insertion-event signal to said software system, wherein said software system, in response to receiving said PCIe hotinsertion-event signal, loads a driver for an application-function device coupled to said second PCIe device.

14. A method for controlling a plurality of peripheral component interconnect express (PCIe) channels in a PCIe channel switch, said method comprising:

controlling, using a control circuit in said PCIe channel switch, on/off states of said plurality of PCIe channels, wherein each PCIe channel of said plurality of PCIe channels is operable for connecting to a host device, and wherein said each PCIe channel of said plurality of PCIe channels is operable for connecting said host device with an electronic device via a respective PCIe device of a plurality of PCIe devices;

selecting a PCIe channel of said plurality of PCIe channels to be turned on;

turning off the other channels of said plurality of PCIe channels when said selected PCIe channel is turned on; and enabling communication between said host device and a selected electronic device through said selected PCIe channel, wherein a respective plug-in state of said each PCIe channel comprises a device-plugged-in state and a device-unplugged state, wherein said plurality of PCIe channels comprise a first PCIe channel and a second PCIe channel, and wherein said method further comprises:

when a communication link between said host device and a second PCIe device of said plurality of PCIe devices and corresponding to said second PCIe channel is established, when said second PCIe device is out of order, and when said first PCIe channel is in said device-plugged-in state, performing a plurality of steps comprising:

(a) turning off said second PCIe channel and turning on said first PCIe channel;

(b) after said step (a), determining whether said PCIe channel switch is in a condition of a first condition and a second condition, wherein said PCIe channel switch is in said first condition when said host device is establishing a communication link, and wherein said PCIe channel switch is in said second situation when said PCIe channel switch comprises a communication link that is established and is in a fully active state (L0);

(c) if said PCIe channel switch is in a condition of said first condition and said second condition, turning off said first PCIe channel to cause a root complex of said host device to send a PCIe hot-removal-event signal to a software system of said host device;

(d) starting a timer for a preset time interval when said first PCIe channel is turned off in said step (c), wherein said software system, in response to receiving said PCIe hot-removal-event signal, unloads a driver for an application-function device coupled to said second PCIe device during said preset time interval; and (e) when said preset time interval expires, turning on said first PCIe channel, causing said root complex of said host device to send a PCIe hot-insertion-event signal to said software system, wherein said software system, in response to receiving said PCIe hot-insertion-event signal, loads a driver for an application-function device coupled to a first PCIe device of said plurality of PCIe devices and corresponding to said first PCIe channel.

15. A data transmission system comprising:
a host device; and
a peripheral component interconnect express (PCIe) channel switch coupled to said host device and comprising:
a plurality of PCIe channels, each PCIe channel of said plurality of PCIe channels operable for connecting said host device with an electronic device via a respective PCIe device of a plurality of PCIe devices; and
a control circuit coupled to said plurality of PCIe channels and operable for controlling an on/off state of said each PCIe channel, wherein said control circuit is further operable for selecting a PCIe channel of said plurality of PCIe channels to be turned on and for turning off the other channels of said plurality of PCIe channels when said selected PCIe channel is on, enabling communication between said host device and a selected electronic device through said selected PCIe channel,
wherein a respective plug-in state of said each PCIe channel comprises a device-plugged-in state and a device-unplugged state, wherein said plurality of PCIe channels comprises a first PCIe channel and a second PCIe channel, and wherein said data transmission system is configured to perform a plurality of steps when a communication link between said host device and a first PCIe device of said plurality of devices and corresponding to said first PCIe channel is established, when said second PCIe channel is in said device-plugged-in state, and when a priority level of a second PCIe device of said plurality of PCIe devices and corresponding to said second PCIe channel is higher than a priority level of said first PCIe device, said plurality of steps comprising:

turning off, using said control circuit, said first PCIe channel, causing a root complex of said host device to send a PCIe hot-removal-event signal to a software system of said host device;

starting a timer for a preset time interval when said first PCIe channel is turned off;

in response to receiving said PCIe hot-removal-event signal, said software system unloading a driver for an application-function device coupled to said first PCIe device, wherein said software system unloads said driver during said preset time interval;

when said preset time interval expires, said control circuit turning on said second PCIe channel to cause said root complex of said host device to send a PCIe hot-insertion-event signal to said software system; and in response to receiving said PCIe hot-insertion-event signal, said software system performing a plurality of steps comprising:
identifying a type of said second PCIe device;
configuring said second PCIe device; and
loading a driver for an application-function device coupled to said second PCIe device.

16. A data transmission system comprising:
a host device; and
a peripheral component interconnect express (PCIe) channel switch coupled to said host device and comprising:
a plurality of PCIe channels, each PCIe channel of said plurality of PCIe channels operable for connecting said host device with an electronic device via a respective PCIe device of a plurality of PCIe devices; and
a control circuit coupled to said plurality of PCIe channels and operable for controlling an on/off state of said each PCIe channel, wherein said control circuit is further operable for selecting a PCIe channel of said plurality of PCIe channels to be turned on and for turning off the other channels of said plurality of PCIe channels when said selected PCIe channel is on, enabling communication between said host device and a selected electronic device through said selected PCIe channel, wherein a respective plug-in state of said each PCIe channel comprises a device-plugged-in state and a device-unplugged state, wherein said plurality of PCIe channels comprises a first PCIe channel and a second PCIe channel, and wherein said data transmission system is configured to perform a plurality of steps when a communication link between said host device and a first PCIe device of said plurality of devices and corresponding to said first PCIe channel is established and said second PCIe channel is in said device-plugged-in state, said plurality of steps comprising:

(a) turning off said second PCIe channel and turning on said first PCIe channel, using said control circuit;

(b) after said step (a), determining whether said PCIe channel switch is in a condition of a first condition and a second condition, wherein said PCIe channel switch is in said first condition when said host device is establishing a communication link, and wherein said PCIe channel switch is in said second condition when said PCIe channel switch comprises a communication link that is established and is in a fully active state (L0);

(c) if said PCIe channel switch is in a condition of said first condition and said second condition after said step (a), then turning off, using said control circuit, said first PCIe channel to cause a root complex of said host device to send a PCIe hot-removal-event signal to a software system of said host device;

(d) starting a timer for a preset time interval when said first PCIe channel is turned off in said step (c), wherein said software system, in response to receiving said PCIe hot-removal-event signal, unloads a driver for an application-function device coupled to a second PCIe device of said plurality of PCIe devices and corresponding to said second PCIe channel during said preset time interval;

(e) when said preset time interval expires, turning on, using said control circuit, said first PCIe channel to cause said root complex of said host device to send a PCIe hot-insertion-event signal to said software system; and (f) in response to receiving said PCIe hot-insertion-event signal, said software system performing a plurality of steps comprising:
    identifying a type of said first PCIe device;
    configuring said first PCIe device; and
    loading a driver for an application-function device coupled to said first PCIe device.

\* \* \* \* \*